US012698978B2

(12) United States Patent
Malek-Mohammadi et al.

(10) Patent No.: US 12,698,978 B2
(45) Date of Patent: Aug. 4, 2026

(54) GEOMETRY AWARE MAP GENERATION MODEL WITH POLYLINES

(71) Applicant: QUALCOMM Incorporated, San Diego, CA (US)

(72) Inventors: Mohammadreza Malek-Mohammadi, Solna (SE); Behnaz Rezaei, San Diego, CA (US); Saeed Dabbaghchian, Bromma (SE); Senthil Kumar Yogamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 18/884,017

(22) Filed: Sep. 12, 2024

(65) Prior Publication Data

US 2026/0071888 A1     Mar. 12, 2026

(51) Int. Cl.
*G01C 21/00*       (2006.01)
*G06T 11/23*       (2026.01)
*G06T 11/60*       (2006.01)

(52) U.S. Cl.
CPC ..... *G01C 21/3819* (2020.08); *G01C 21/3837* (2020.08); *G06T 11/23* (2026.01); *G06T 11/60* (2013.01)

(58) Field of Classification Search
CPC ..... G06T 11/23; G06T 11/60; G91C 21/3819; G91C 21/3837
USPC ........................................................ 345/442
See application file for complete search history.

(56) References Cited

U.S. PATENT DOCUMENTS

| | | | |
|---|---|---|---|
| 8,614,703 B1 | 12/2013 | Fong et al. | |
| 11,681,746 B2 | 6/2023 | Liang et al. | |
| 2016/0358349 A1 | 12/2016 | Dorum | |
| 2023/0296404 A1* | 9/2023 | Zhang | G01C 21/3804 |
| | | | 701/450 |
| 2024/0233393 A1* | 7/2024 | Tairbekov | G06V 20/58 |

(Continued)

FOREIGN PATENT DOCUMENTS

| | | | | |
|---|---|---|---|---|
| CN | 115571163 A | * | 10/2022 | B60W 60/00 |
| DE | 102023109040 A1 | | 4/2024 | |

OTHER PUBLICATIONS

Qi Li, Yue Wang, Yilun Wang, Hang Zhao, "HDMapNet: An Online HD Map Construction and Evaluation Framework", Computer Vision and Pattern Recognition, Submitted on Jul. 13, 2021 (v1), last revised Mar. 18, 2022 (this version, v4).*

(Continued)

*Primary Examiner* — Jin Ge
(74) *Attorney, Agent, or Firm* — QUALCOMM Incorporated; Espartaco Diaz Hidalgo

(57) ABSTRACT
Certain aspects of the present disclosure provide a method for generating a map. A method generally includes obtaining sensor data from one or more sensors, the sensor data corresponding to an environment comprising one or more features including a first feature having one or more changes in curvature; inputting the sensor data to a map generation model; and obtaining as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a threshold.

20 Claims, 16 Drawing Sheets

Ground truth

(56) References Cited

U.S. PATENT DOCUMENTS

| 2024/0282118 | A1 | | 8/2024 | Zheng et al. | |
|---|---|---|---|---|---|
| 2024/0404074 | A1 | | 12/2024 | Zhang et al. | |
| 2025/0035448 | A1 | * | 1/2025 | Myeong | G01S 13/931 |
| 2025/0139986 | A1 | * | 5/2025 | Kum | G06T 3/4038 |
| 2025/0224250 | A1 | * | 7/2025 | Wang | G01C 21/3896 |
| 2025/0272987 | A1 | * | 8/2025 | Luettin | G06V 10/84 |

OTHER PUBLICATIONS

Liao B., et al., "MAPTR: Structured Modeling and Learning for Online Vectorized HD Map Construction", arXiv:2208.14437v2 [cs.CV] Jan. 30, 2023, Published as a Conference Paper at ICLR 2023, pp. 1-18.
Liao B., et al., "MapTRv2: An End-to-End Framework for Online Vectorized HD Map Construction", arXiv:2308.05736v1 [cs.CV] Aug. 10, 2023, pp. 1-17.
Xu Z., et al., "InsMapper: Exploring Inner-instance Information for Vectorized HD Mapping", arXiv:2308.08543v4 [cs.CV] Mar. 9, 2024, 17 Pages.
Brownlee J., "Use Early Stopping to Halt the Training of Neural Networks at the Right Time", Machine Learning Mastery, Aug. 25, 2020, pp. 1-17.
Gao H., et al., "CVR-LSE: Compact Vectorization Representation of Local Static Environments for Unmanned Ground Vehicles", arXiv:2206.06635v1 [cs.RO] Jun. 14, 2022, pp. 1-13.
Gao H., et al., "CVR-LSE: Compact Vectorized Representation of Local Static Environments for Reliable Obstacle Detection", IEEE Transactions on Industrial Electronics, IEEE Service Center, Piscataway, NJ, USA, vol. 71, No. 8, Oct. 19, 2023, pp. 9309-9318, XP011967225, Section I, III and figure 1.
International Search Report and Written Opinion—PCT/US2025/045953—ISA/EPO—Jan. 30, 2026.
Luo R., et al., "Diffusion Track: Diffusion Model For Multi-Object Tracking", arXiv:2308.09905v2 [cs.CV] Feb. 21, 2024, 11 Pages.
Yathish V., "Loss Functions and Their Use In Neural Networks", Towards Data Science, pp. 9-19, Aug. 4, 2022, pp. 1-27.
Zunic J., et al., "A New Convexity Measure for Polygons", IEEE Transactions on Pattern Analysis and Machine Intelligence, vol. 26, No. 7, Jul. 2004, pp. 923-934.

* cited by examiner

164

$$P = [v_1, v_2, v_3, \ldots, v_i, \ldots, v_{N-1}, v_N]$$

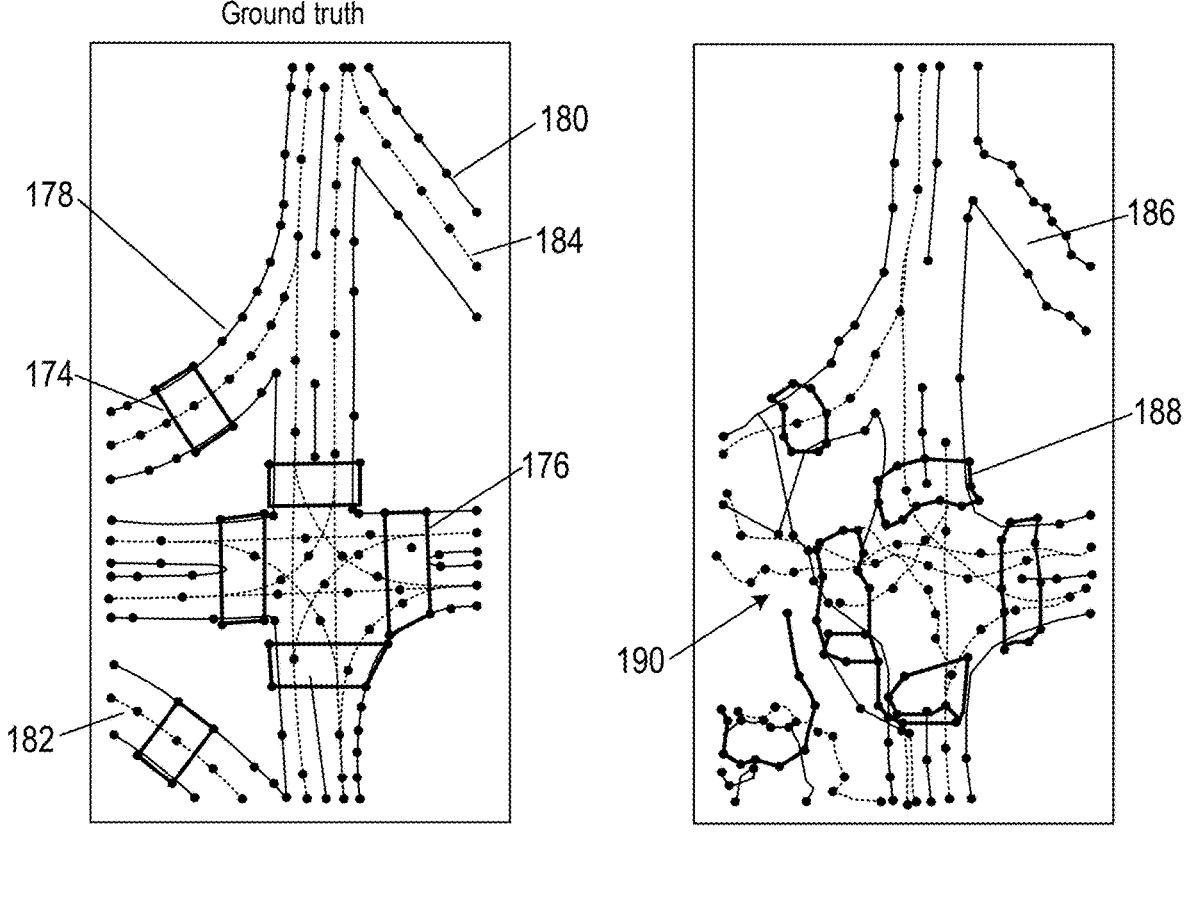
FIG. 1F          FIG. 1G

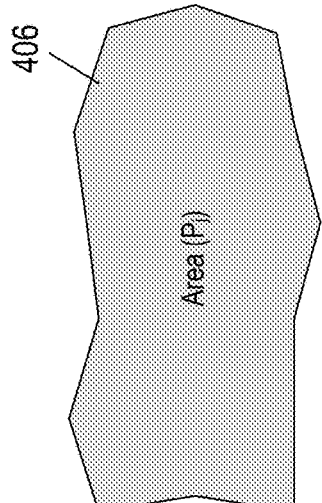
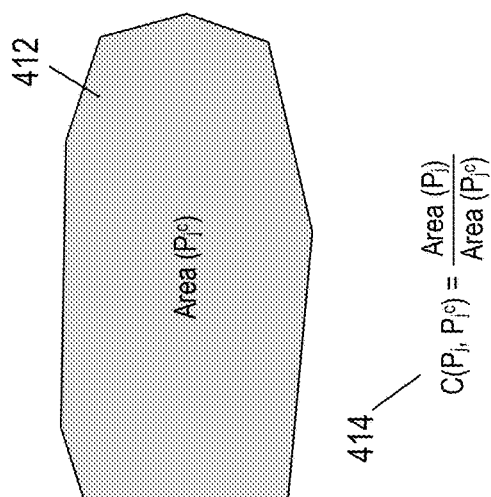
$$C(P_j, P_j^c) = \frac{Area(P_j)}{Area(P_j^c)}$$
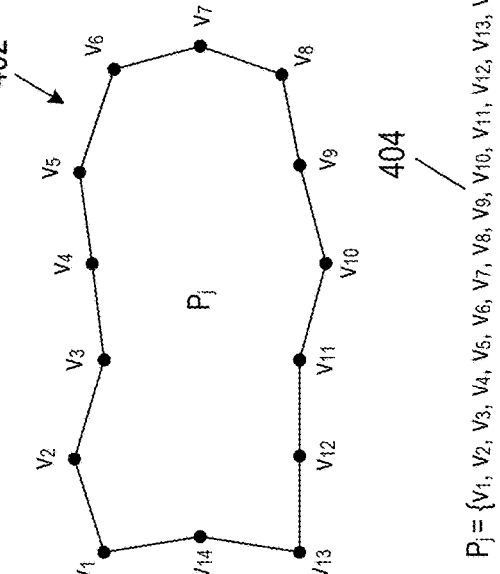
$$P_j = \{v_1, v_2, v_3, v_4, v_5, v_6, v_7, v_8, v_9, v_{10}, v_{11}, v_{12}, v_{13}, v_{14}\}$$
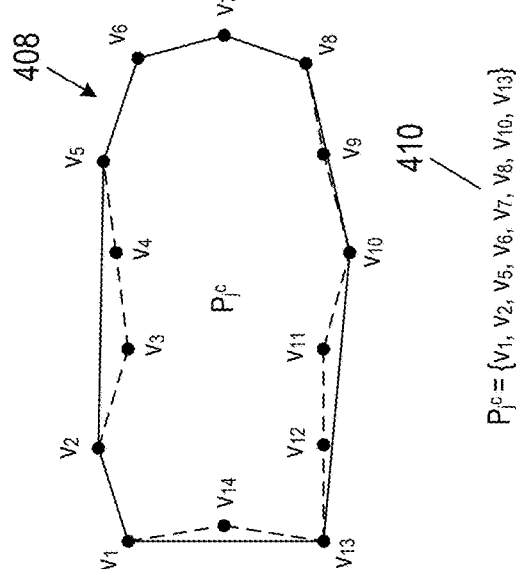
$$P_j^c = \{v_1, v_2, v_5, v_6, v_7, v_8, v_{10}, v_{13}\}$$
FIG. 4

$$d_{ba} = x_b - x_a > 0 \qquad X_{12} = 0$$

$$d_{ab} = x_b - x_a > 0$$

$$d_{cd} = x_c - x_d < 0$$

$$X_{34} = 1$$

$$L_g = w\| \text{vec}(X) \|_1$$

602

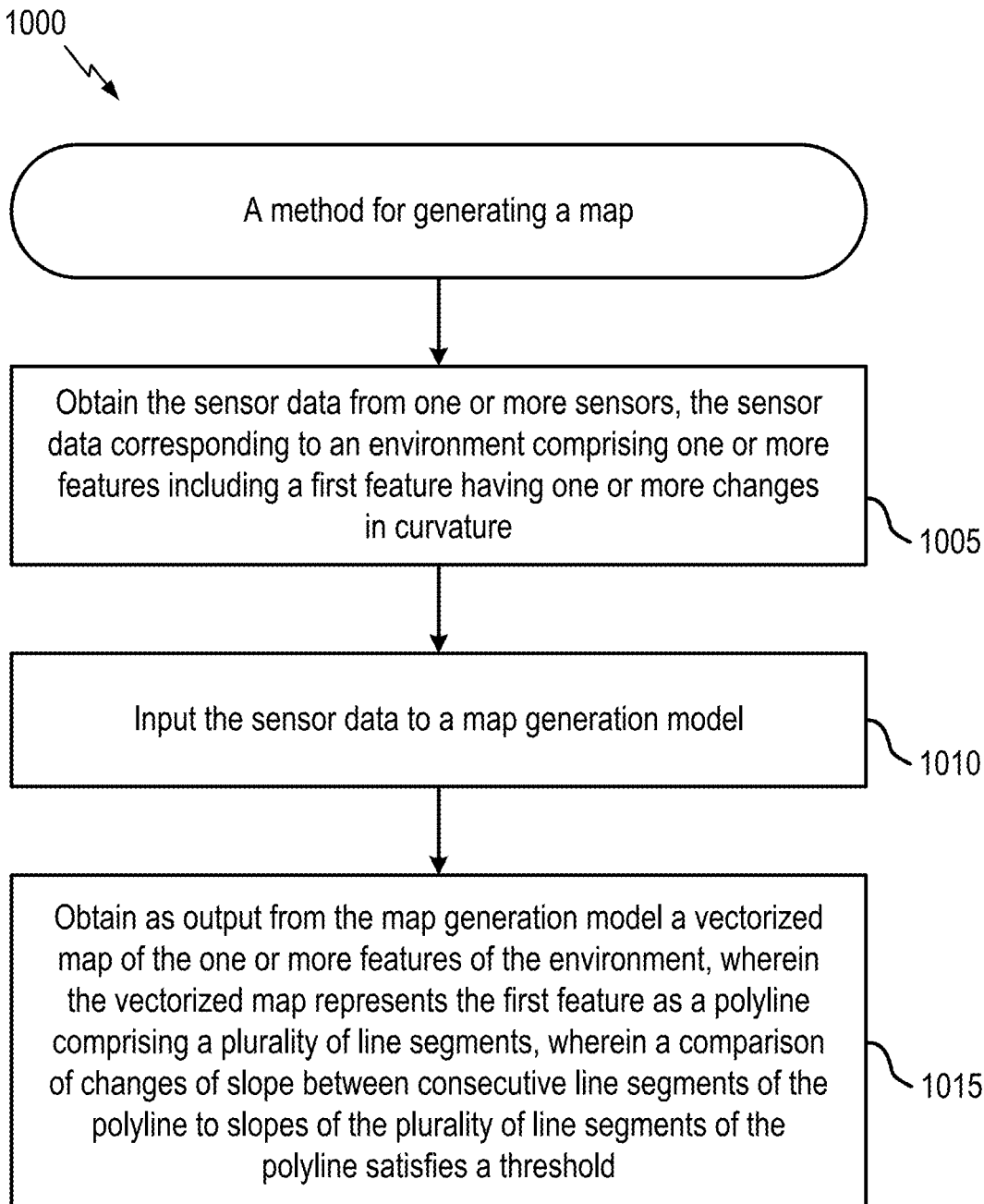

1000

A method for generating a map

Obtain the sensor data from one or more sensors, the sensor data corresponding to an environment comprising one or more features including a first feature having one or more changes in curvature

1005

Input the sensor data to a map generation model

1010

Obtain as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a threshold

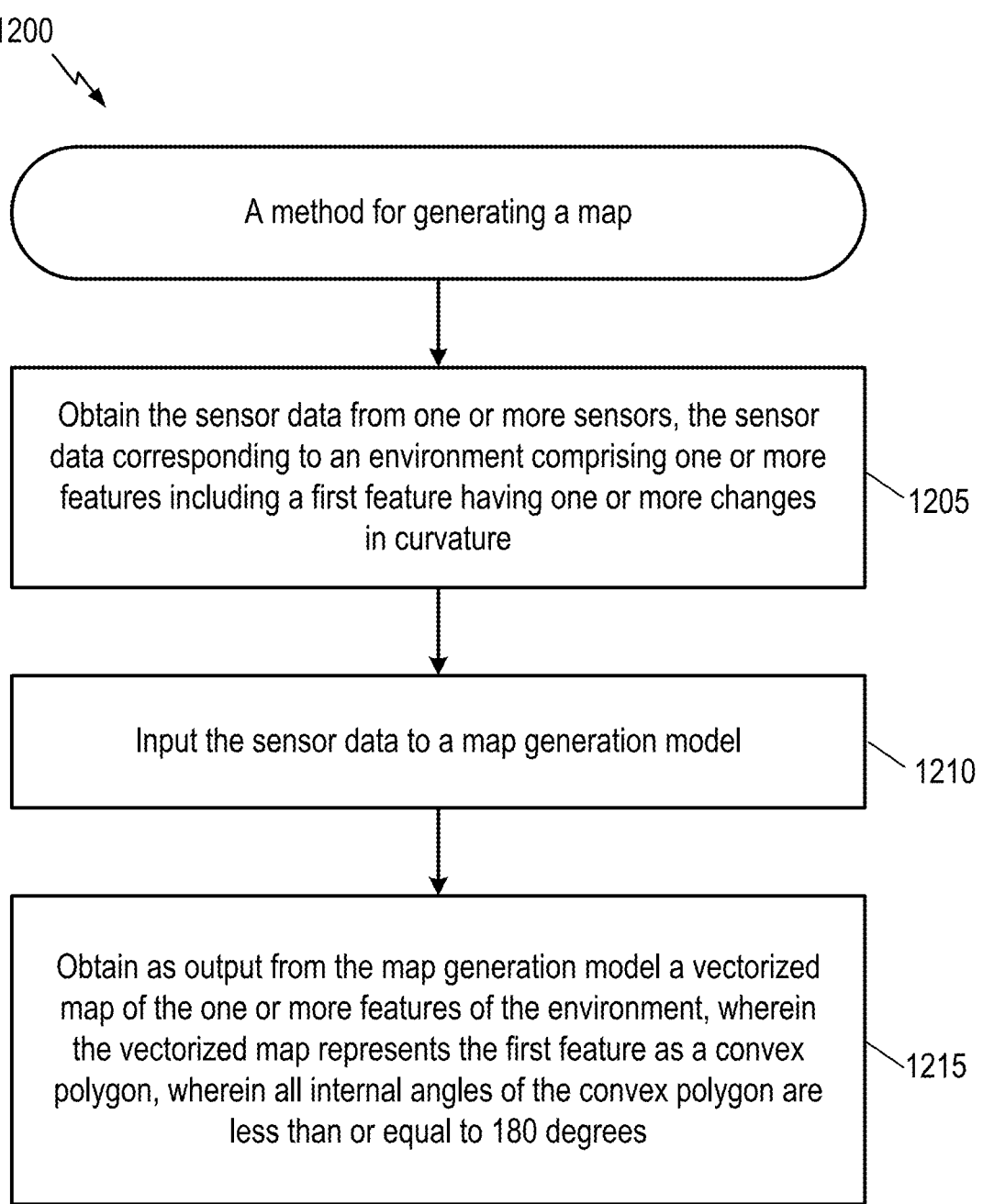

A method for generating a map

Obtain the sensor data from one or more sensors, the sensor data corresponding to an environment comprising one or more features including a first feature having one or more changes in curvature

1205

Input the sensor data to a map generation model

1210

Obtain as output from the map generation model a vectorized map of the one or more features of the environment, wherein the vectorized map represents the first feature as a convex polygon, wherein all internal angles of the convex polygon are less than or equal to 180 degrees

GEOMETRY AWARE MAP GENERATION MODEL WITH POLYLINES

FIELD OF THE DISCLOSURE

Aspects of the present disclosure relate to techniques for map generation.

DESCRIPTION OF RELATED ART

In recent years, the automobile industry has turned to developing onboard advanced driving assistance systems (ADASs) that enable (e.g., autonomous) vehicles to drive more safely with environmental awareness, and in some cases with limited, or without any, intervention from human drivers. In some cases, an ADAS receives sensor data obtained from one or more sensors, such as onboard digital cameras, lidar sensors, or radar sensors of a vehicle and may use such sensor data, along with a map of an environment surrounding the vehicle, to enable the onboard ADAS to navigate or adjust a response of the vehicle along roads of the environment. For more accurate and safe navigation of the vehicle, the map may need to contain detailed and accurate locations of lane lines, pedestrian crossings, roundabouts, traffic islands, lane dividers, center lines, and road boundaries in the environment surrounding the vehicle. Accordingly techniques for accurate map generation may be useful for ADASs, or even other uses cases, such as navigation systems or even non-automotive use cases.

In certain cases, map generation may involve collecting sensor data of an environment, such as using one or more sensors, such as digital cameras, lidar sensors, or radar sensors. Such sensor data may be collected, for example, by one or more vehicles, or other devices including the one or more sensors. Such sensor data may be input into a map generation model (e.g., running on one or more devices, such as an automobile or device including the one or more sensors, a device separate from the one or more sensors such as a server, etc.) configured to generate the map. For example, a map generation model may be a machine learning (ML) model trained to generate a map based on sensor data.

Although technological advancements in map generation models have been made, challenges with producing accurate maps from these models still persist. For example, map generation models are typical trained with traditional deep-learning methods based on sensor data. The resulting maps, however, often contain lane lines, road boundaries, and pedestrian crossings that do not accurately correspond to actual features in the environment. For example, these map generation models often produce maps with irregular-shaped pedestrian crossings that do not resemble the actual shape and size of pedestrian crossings and often have randomly-shaped center lines and road boundaries that do not accurately represent roads. Maps with such defects may not be useful for certain use cases, such as for ADASs to safely navigate autonomous vehicles in an urban environment. Consequently, there is a need for further improvements to training map generation models to overcome the aforementioned technological problems.

SUMMARY

Certain aspects provides a method for generating a map. The method comprises obtaining sensor data from one or more sensors, the sensor data corresponding to an environment comprising one or more features including a first feature having one or more changes in curvature; inputting the sensor data to a map generation model; and obtaining as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a threshold.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to (e.g., cause the apparatus to) perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 1F-1G depict an example ground truth vectorized map and an example defective vectorized map, respectively.

FIG. 4 depicts an example non-convex polygon and an example convex hull of the polygon.

FIG. 10 depicts a flow diagram of a method for generating a map based on sensor data.

FIG. 12 depicts a flow diagram of a method for generating a map based on sensor data.

DETAILED DESCRIPTION

Figure 1A:
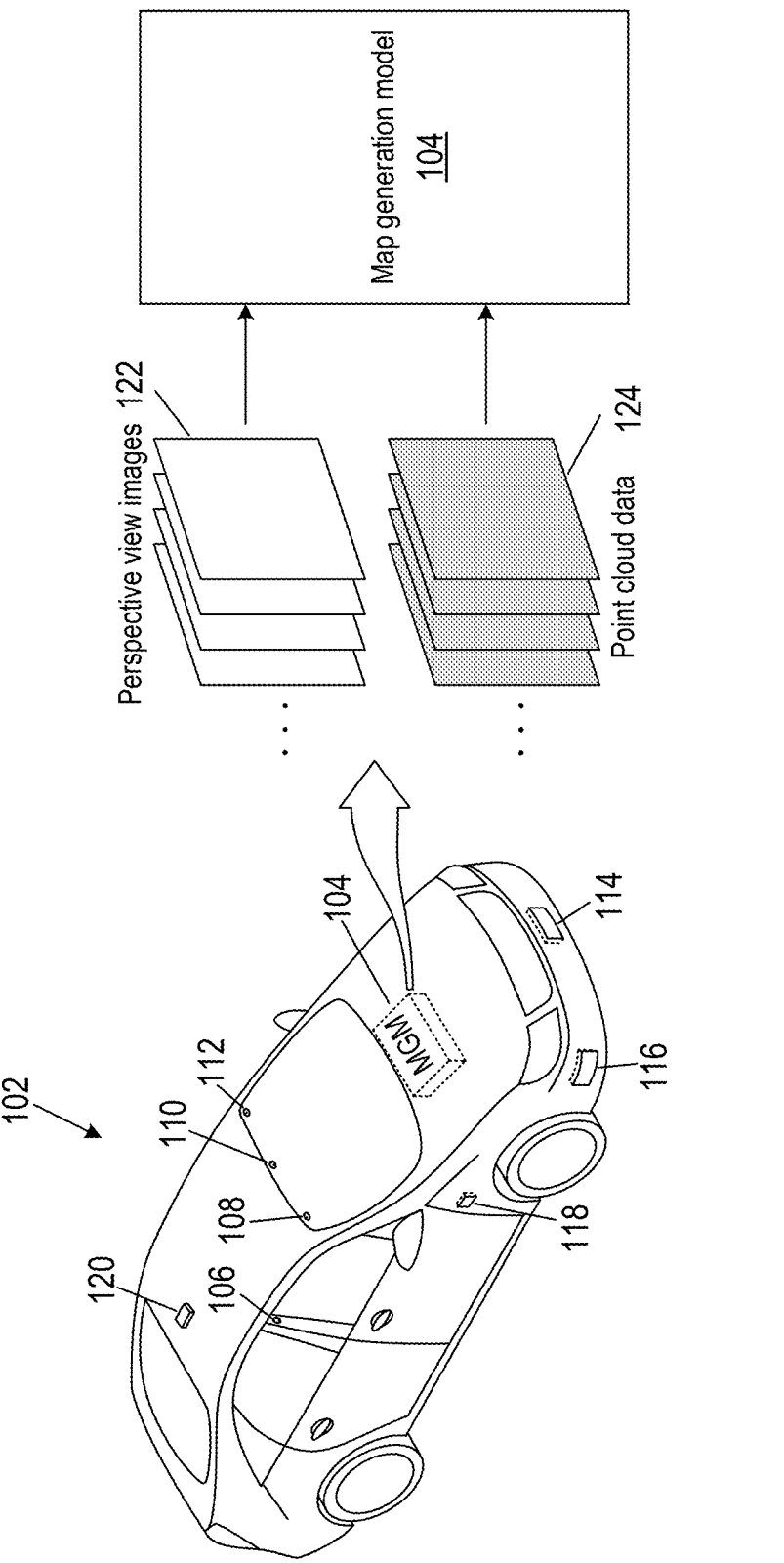
FIG. 1A depicts an example of onboard sensors of a vehicle and how sensor data output from the sensors is input to a map generation model.

As discussed, one technical problem with current map generation models is that these models may generate maps that inaccurately represent certain features (e.g., objects) in an environment, such as irregular-shaped pedestrian crossings that do not resemble the actual shape and size of pedestrian crossings, randomly-shaped center lines and road boundaries that do not accurately represent roads, etc.

In certain aspects, the techniques herein provide a technical solution to the technical problem of accurately generating maps, such as by providing one or more map generation models configured to generate maps, which in certain aspects may more accurately represent features (e.g., objects) of an environment. In certain aspects, a map generation model is configured to generate a vectorized map representing a feature of the environment as a polyline that includes a plurality of line segments. The map generation model may generate the polyline such that a comparison (e.g., ratio) of changes of slope between consecutive line segments of the polyline to slopes (e.g., average of the slopes, other function of the slopes, etc.) of the plurality of line segments of the polyline satisfies a threshold (e.g., is less than a threshold). Such a comparison satisfying the threshold may be indicative of a reduction in abrupt changes in slope between line segments of the polyline. Accordingly, the polyline may have a smoother representation, thereby more accurately representing the object. For example, typical objects may not have such abrupt changes.

In certain aspects, a map generation model is configured to generate a vectorized map representing a feature of the environment as a convex polygon, wherein all internal angles of the convex polygon are less than or equal to 180 degrees. Accordingly, the polygon may have a smoother representation, thereby more accurately representing the object. For example, typical objects may not have concavities, and instead may be represented by convex polygons.

In certain aspects, a single map generation model is configured to represent features as convex polygons, as appropriate, and represent features as polylines, as appropriate. Such aspects may provide reduced computations by using a single model to represent features of different shapes.

In certain aspects, a first map generation model is configured to represent features as convex polygons and a second map generation model is configured to represent features as polylines. In some aspects, the output (e.g., vectorized map) of the two models may be combined to generate a combined output. In certain aspects, use of different models may provide more accuracy, such as through individualized training of the models for different features. In some aspects, a map generation system may include both map generation models and be configured to select which map generation model to use based on which feature is being represented.

Certain aspects provide training techniques for training a map generation model to generate more accurate maps. In certain aspects, through use of a loss function for training, where the loss function is based on (e.g., includes) one or more of: 1) polygon losses of polygon representations of features in an environment (e.g., surrounding a vehicle), such as pedestrian crossings; and/or 2) polyline losses of polyline representations of features, such as lane lines and road boundaries in the environment, the map generation model may be trained to more accurately represent objects in a map. For example, the loss function may be designed to promote convexity of objects and/or reduced abrupt (e.g., by more than 15%) slope changes in the generated map that are expected to be convex and/or relatively smooth throughout. Such convexity promotion and/or reduction in slope change, may for example, reduce irregular shapes in the generated map, such as zig-zags or jagged lines for what should be straight or smoothly curved shapes, such as lane crossings, pedestrian crossings, etc. Accordingly, certain aspects herein provide the technical benefit of more accurate map generation, such as more accurate representation of objects, which may improve use of the map, such as for more accurate vehicle navigation.

Though certain aspects are discussed herein with respect to an environment around a vehicle, it should be noted that the techniques for utilizing and/or training a map generation model herein may be used for other environments. Further, though certain aspects are discussed with respect to sensor data obtained from a vehicle, the sensor data may be obtained from one or more other devices. In addition, though certain aspects are discussed with respect to maps from the map generation model being used for autonomous driving, such maps may be used for other purposes.

FIG. 1A depicts an example of onboard sensor(s) of a vehicle 102 and how sensor data output from the sensors is input to a map generation model 104, which may run on a computing device (e.g., including one or more processors and one or more memories, such as within vehicle 102, separate from vehicle 102, etc.). In this example, the vehicle 102 includes image sensors 106, 108, 110, and 112 (e.g., digital cameras) that capture digital images of different perspective views of an environment surrounding the vehicle 102. The vehicle 102 includes lidar (light detection and ranging) sensors 114, 116, 118, and 120 that each emit thousands of laser pulses each second and detect the reflected light to capture a three-dimensional (3D) point cloud data of the environment surrounding the vehicle 102. The vehicle 102 may also have a global positioning system (GPS) and radar sensors (not shown) that emit radio waves and detect reflected waves to measure the positions, speeds, and trajectories of moving objects in the environment near the vehicle 102.

Note that the number and locations of the image sensors, lidar sensors, and radar sensors are not limited to the image sensors, lidar sensors, and radar sensors shown in FIG. 1A.

In certain aspect, the number and arrangement of the image sensors, lidar sensors, and radar sensors can vary and certain sensors can be omitted. In other aspects, the sensor data can be composed of digital images output from one or more image sensors. In other aspects, the sensor data can be composed of 3D point cloud data output from one or more lidar sensors.

As shown in FIG. 1A, the map generation model 104 receives sensor data from the image sensors 106, 108, 110, and 112 in the form of video frame data 122 of the frontal and perspective views of the environment captured by the cameras and from the lidar sensors 114, 116, 118, and 120 in the form of 3D point cloud data 124. The map generation model 104 may be trained, as described below, to generate a vectorized map of the environment surrounding the vehicle 102.

A polyline is composed of an ordered set of points that are connected by one or more line segments and approximates a curve in a multi-dimensional space. A polygon is a closed polyline where the beginning and ending points of the polyline are the same. Accordingly, a polygon may be a type of polyline. For example, a polyline may be an open polyline or a closed polyline (e.g., a polygon). For example, polylines and/or polygons may be used represent features of roads and streets, such as lane lines, pedestrian crossings, roundabouts, lane dividers, center lines, and road boundaries and outline features of rivers, bodies of water, and buildings.

Figure 1B:
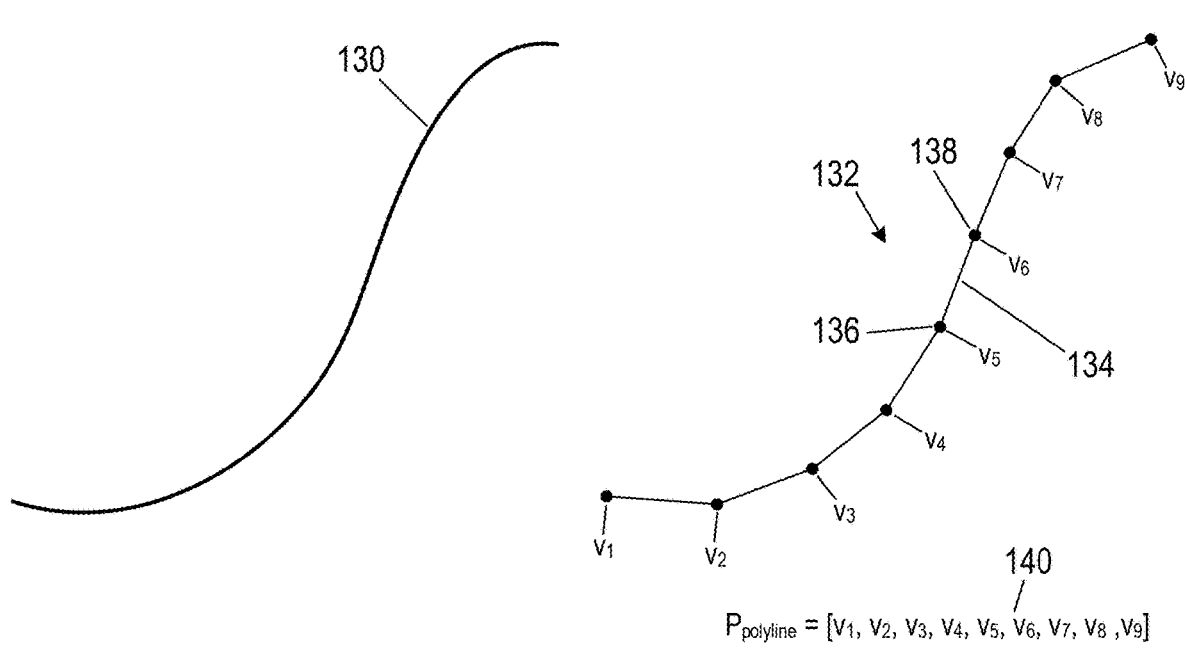
FIG. 1B depicts an example curve and corresponding polyline.

FIG. 1B depicts an example of a curve 130 in an n-dimensional (n-D) space, where n is a positive integer greater than or equal to two. FIG. 1B also depicts an example of a polyline 132 representation of the curve 130. In this example, the polyline 132 is composed of an ordered set of points denoted by $v_i$, where subscript $i=1, 2, \ldots, 9$. Line segments connect pairs of points that correspond to points along the curve 130. For example, a line segment 134 connects a pair of points 136 and 138 denoted by $v_3$ and $v_4$, respectively. The polyline 132 is represented by an ordered set of points 140 denoted by $P_{polyline}$.

Figure 1C:
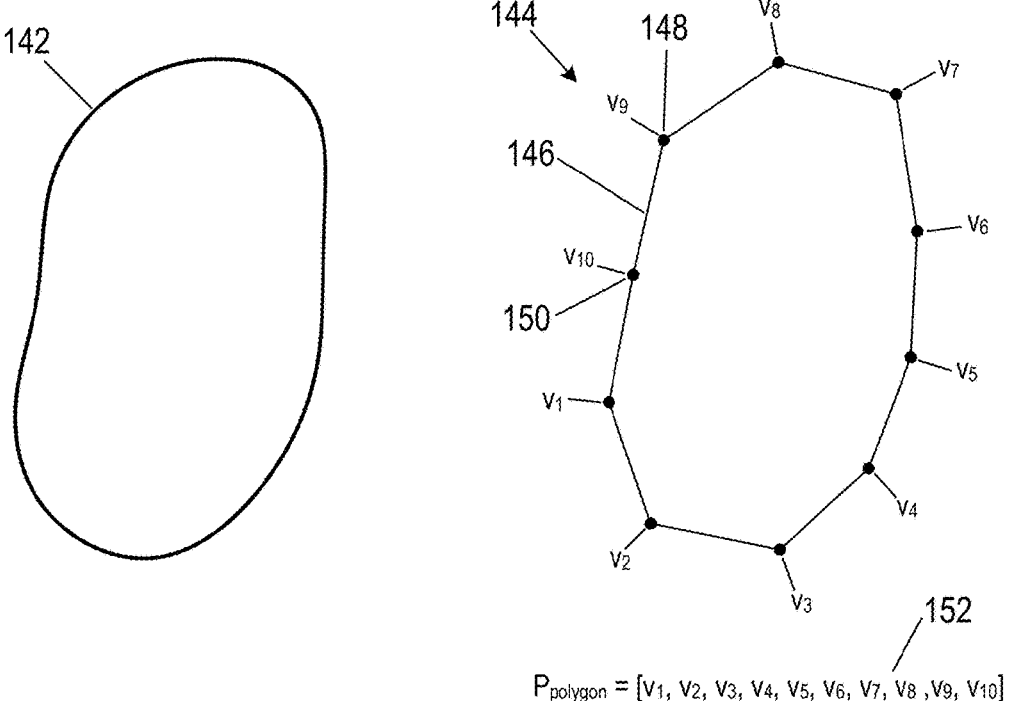
FIG. 1C depicts an example closed curve and corresponding polygon.

FIG. 1C depicts an example of a closed curve 142 in the n-D space and an example of a polygon 144 representation of the closed curve 142. In this example, the polygon 144 is composed of ten points that are connected by ten line segments. Each line segment connects a pair of points that corresponds to points along the closed curve 142. For example, a line segment 146 connects a pair of points 148 and 150 denoted by $v_9$ and $v_{10}$, respectively. The polygon 144 is represented by an ordered set of points 152 denoted by $P_{polygon}$.

Each point of the polyline 132 and the polygon 144 is a set of coordinates in the n-D space and is denoted by $v_i = (x_{1,i}, \ldots, x_{n,i})$, where subscript i is a point index and a second subscript corresponds to one of n different coordinate directions in the n-D space. For example, $x_{1,i}$ corresponds to a first coordinate direction in the n-D space.

Figure 1D:
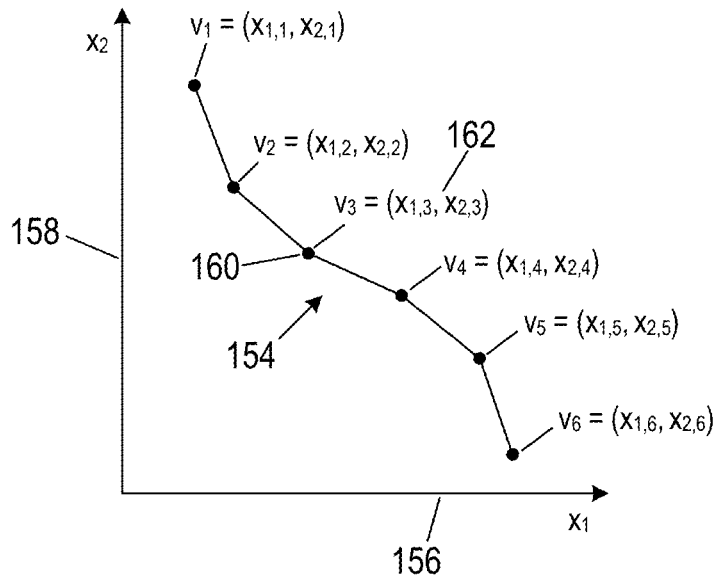
FIG. 1D depicts an example polyline in a two-dimensional (2D) space.

The vectorized map 128 generated by the map generation model 104 is two dimensional. FIG. 1D depicts an example of a polyline 154 in a two-dimensional (2D) space. A horizontal arrow represents a first coordinate axis 156 of the 2D space. A vertical arrow represents a second coordinate axis 158 of the 2D space. Each point of the polyline 154 contains two coordinate values. For example, a point 160 denoted by point $v_3$ is composed of coordinate values 162.

Figure 1E:
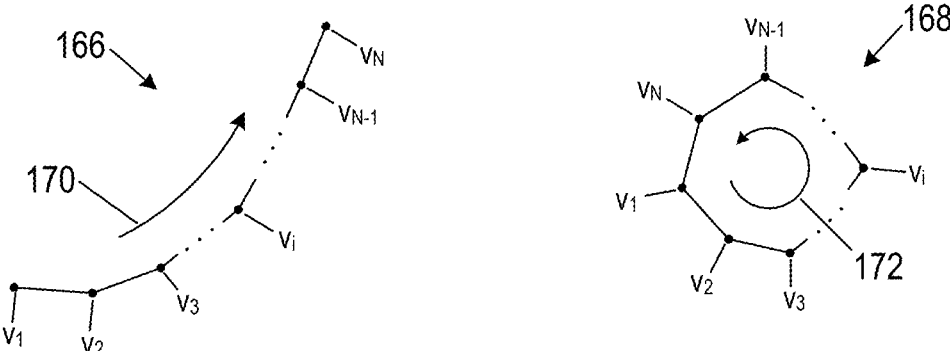
FIG. 1E depicts an example ordered set of points that can represent a polyline or a polygon in an n-dimensional (n-D) space.

FIG. 1E depicts an example set of points 164 that can represent a polyline 166 or a polygon 168 composed of N ordered points in the n-D space. If the set of points 164 represent the polyline 166, the points are ordered as indicated by directional arrow 170. If the set of points 164 represent the polygon 168, the points are ordered as indicated by directional arrow 172.

The vectorized maps generated from map generation model 104 represent features in the environment surrounding the vehicle as polylines and polygons. For example, road boundaries, center lines, and lane boundaries (e.g., lane lines and edge lines) are features of an environment surrounding a vehicle and are represented by polylines in a vectorized map of the environment. Roundabouts, traffic islands, and pedestrian crossing are features of the environment and are represented by polygons in the vectorized map.

However, as discussed, the vectorized maps produced by certain trained map generation models may contain polylines and polygons that do not accurately represent features of the environment surrounding a vehicle. For example, the vectorized maps produced by certain trained map generation models often contain jagged and zig-zag polygon representations of pedestrian crossings, polyline representations of center lines and road boundaries that intersect or are omitted entirely, and often contain randomly shaped polylines and polygons that do not resemble features of an environment surrounding the vehicle. As a result, for example, ADASs cannot use vectorized maps with the above described defects to safely navigate autonomous vehicles.

FIGS. 1F-1G depict an example ground truth vectorized map (FIG. 1F) and an example defective vectorized map (FIG. 1G) produced by a map generation model that has been trained using a traditional deep-learning method (as in not using the techniques disclosed herein) for the same intersection of roads. A side-by-side comparison of the maps in FIGS. 1F-1G reveal the technological problem associated with map generation models that have been trained using traditional deep-learning methods.

In FIG. 1F, the polygons and polylines clearly display pedestrian crossings, road boundaries, and lanes of the streets at the intersection. For example, pedestrian crossing are represented by rectangles and regular trapezoidal-shaped polygons, such as polygons 174 and 176, respectively. Lane boundaries, such as lane lines and edge lines, are represented by smooth polylines, such as polylines 178 and 180. Center lines clearly separate the lanes of the roads and are also represented by smooth polylines, such as polylines 182 and 184. In other words, the ground truth vectorized map in FIG. 1F is composed of polygons and polylines that clearly demarcate pedestrian crossings, road boundaries, center lines, and the lanes and match the layout of actual features in the environment. An ADAS can use the map in FIG. 1F to safely navigate an autonomous vehicle through and around the intersection.

By contrast, in FIG. 1G, the polygons and polylines representing features of the intersection are irregular shaped and the polygons and polylines in certain regions do not resemble road boundaries or pedestrian crossings. For example, roads, such as road 186, do not have a polyline representation of a center line. The polygon representations of the pedestrian crossings, such as polygon 188, are irregular shaped. Region 190 does not resemble a road with lane boundaries and center lines because the corresponding polylines are randomly placed. The polylines that should represent road boundaries and center lines in the region 190 appear random. An ADAS cannot use the map in FIG. 1G to safely navigate an autonomous vehicle.

A map generation model may traditionally be trained using an iterative deep learning process that adjusts parameters of the map generation model until a loss function associated with the map generation model reaches a minimum. At each iteration, the map generation model may generate a predicted vectorized map from subsets of training sensor data. However, the loss functions that are traditionally used to train map generation models (as in not the loss functions of the techniques disclose herein) do not include loss terms associated with irregular or randomly-shaped polygon and polyline shaped features in an environment represented by each predicted vectorized map. In other words, the loss function of a traditionally trained map generation model does not generate penalties in the deep learning process for permitting irregular or randomly-shaped polygon and polyline representations of features of an environment of each predicted vectorized map. The loss function is instead minimized with respect to parameters of the map generation model that do not ensure the polygons and polylines of the predicted vectorized maps produced during training converge on shapes that accurately represent features of the environment. As a result, the map generation model obtained from traditional iterative deep learning with a traditional loss function generates vectorized maps, from sensor data, that do not accurately characterize pedestrian crossing, center lines, and lane boundaries as described above with reference to the example vectorized map in FIG. 1F.

In certain aspects, techniques discussed herein are associated with a new approach to training a map generation model based on sensor data obtained by one or more sensors, such as digital images obtained from one or more image sensors, such as digital cameras, 3D point cloud data obtained from one or more lidar sensors, and/or the like. In certain aspects, such techniques may provide a technical solution to the above described technological problems with existing approaches to training a map generation model. In certain aspects, the loss function includes one or more of: 1) a polygon loss that represents a loss associated with irregular polygon-shaped features in the environment, or 2) a polyline loss, that represents a loss associated with zig-zag or jagged-shaped features in the environment. In certain aspects, the loss function used to train a map generation model (e.g., iteratively_train a map generation model using deep learning) is given by:

$$\text{Loss} = \alpha_1 L_{trans} + \alpha_2 L_{polygon} + \alpha_3 L_{polyline} \qquad \text{Equation (1)}$$

where $\alpha_1$, $\alpha_2$, and $\alpha_3$ are loss contribution weights that are adjusted during training;

$L_{trans}$ is a loss function (e.g., traditionally used to train a map generation model);

$L_{polygon}$ is the polygon loss of polygon representations of features in an environment; and $L_{polyline}$ is the polyline loss of polyline representations of features in the environment.

In certain aspects, with respect to the loss function in Equation (1), overall training is supervised with a set of labelled sensor data (e.g., training data). The advantage of the loss function in Equation (2) is that there is no need for additional labelling of the training data.

In certain aspects, with respect to the traditional loss function $L_{trans}$ the map generation model can be trained using supervised learning. In other words, the map generation model can be trained on sets of ground truth vectorized maps using the technique of gradient descent to minimize the loss function $L_{trans}$. For example, the loss function $L_{trans}$ may have classification loss terms, such as cross entropy or focal loss.

In certain aspects, the polygon loss $L_{polygon}$ and the polyline loss $L_{polyline}$ are used to train the map generation model according to an unsupervised learning setting. With unsupervised learning, the polyline loss and the polygon loss contribute to training the map generation model based on sets of unlabeled sensor data and not on sets of ground truth vectorized maps.

In certain aspects, the loss function, $L_{polygon}$, in Equation (1) is used to train a map generation model using sensor data obtained by one or more sensors of a vehicle. In certain aspects, the polygon loss, $L_{polygon}$, adds a penalty value to the loss function in Equation (1) for one or more polygons of a predicted vectorized map generated during training that is not convex and gives a zero value for each polygon of a predicted vectorized map generated during training that is convex. In other words, as the polygons of each predicted vectorized map produced in each iteration of the training process converge on convex-shaped polygons (e.g., internal angles of the polygons are less than or equal to 180 degrees), the associated polygon loss of the loss function in Equation (1) approaches zero (e.g., $L_{polygon} \rightarrow 0$), which is an example of unsupervised loss. For example, if at some point during training the polygon loss contribution to the loss function reaches zero (or is within a threshold of 0), then polygon representations of pedestrian crossing are convex-shapes, such as rectangles or regular-shaped trapezoids as shown in the example ground truth vectorized map of FIG. 1G.

In certain aspects, the polyline loss, $L_{polyline}$, in Equation (1) is also used to train a map generation model using supervised learning based on sensor data obtained by one or more sensors of a vehicle. In certain aspects, the polyline loss, $L_{polyline}$, adds a penalty value to the loss function for one or more polylines of a predicted vectorized map based on the degree of smoothness of each polyline and/or intersections with self and/or other polylines in a predicted vectorized map generated during training. In other words, as the polylines of each predicted vectorized map produced in each iteration of the training process converge on smoothly varying and non-intersecting polylines and away from having random variations, the associated polyline loss approaches zero (e.g., $L_{polyline} \rightarrow 0$), which is an example of unsupervised loss. For example, if at some point during training the polyline loss contribution to the loss function reaches zero (or is within a threshold of 0), then polyline representations of center lines and road boundaries are smoothly varying and substantially parallel, such as the polyline representations of center lines and road boundaries as shown in the example ground truth vectorized map of FIG. 1G.

In another aspect, a map generation model obtained from training with the loss function in Equation (1) can be integrated with an ADAS or a separate device and used to generate vectorized maps that can be used to safely navigate an autonomous vehicle. In certain aspects, the map generation model may even be used for real-time map generation. For example, while a (e.g., autonomous) vehicle travels a road, the map generation model inputs real-time sensor data obtained from one or more onboard sensors into the map generation model to generate accurate vectorized maps of features of the environment surrounding the vehicle. The vehicle (or another vehicle) can rely on the vectorized maps to perceive and interpret road features and obstacles in the environment, thereby enhancing the ability of ADASs to safely navigate vehicles along roads in environment to a selected destination.

Aspects Related to Training a Map Generation
Model

Figure 2:
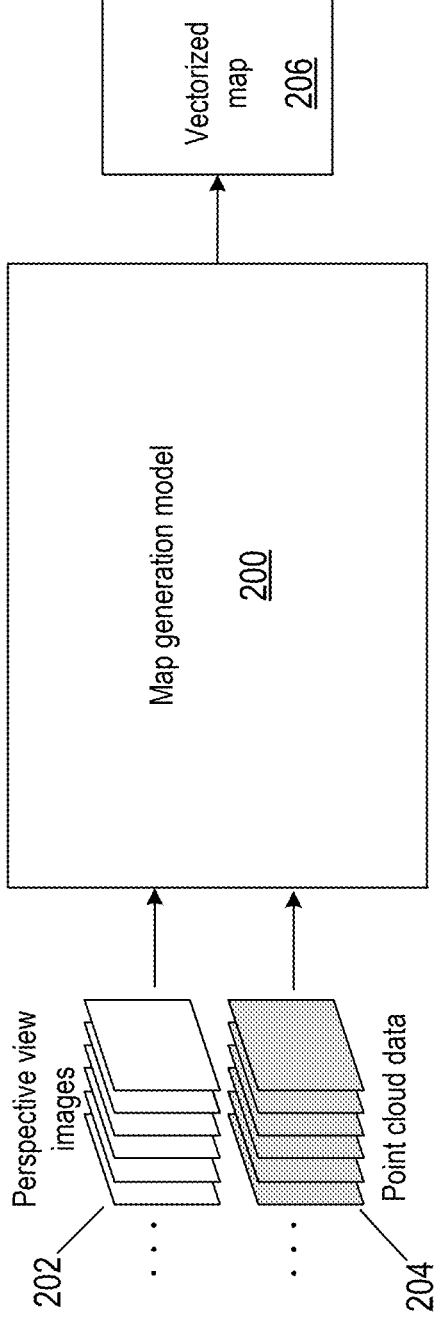
FIG. 2 depicts an example of a map generation model.

FIG. 2 depicts an example of input and output of a map
generation model 200. In this example, the map generation
model 200 receives as input sensor data corresponding to
one or more sensors, such as obtained by one or more
sensors of a vehicle as discussed. Though certain types of
sensor data are described with respect to map generation
model 200 for ease of illustration, it should be noted that
additional and/or alternative sensor data may be used, or
even less sensor data (e.g., only one of images 202 or point
cloud data 204).

In certain aspects, the sensor data may be perspective
view images 202 of an environment surrounding an autono-
mous vehicle (e.g., an automobile, robot, or a drone)
obtained from the one or more image sensors recording
different perspective views of the environment. In certain
aspects, the sensor data may include 3D point cloud data 204
obtained from the one or more lidar sensors. In certain
aspects, the point cloud data comprises xyz-coordinates of
points in the environment, the intensity of laser light at each
point of the point cloud data, and a surface normal at each
point of the point cloud data. The map generation model 200
generates a vectorized map 206, which may be a high-
definition (HD) map, in which features in the environment
are represented by polylines and polygons.

In certain aspects, the map generation model 200 is or has
been trained as described below to generate a vectorized
map with convex polygon representations of features (e.g.,
pedestrian crossings, roundabouts, or traffic islands) in the
environment surrounding the vehicle. The convex polygons
have internal angles less than or equal to 180 degrees.

In certain aspects, the map generation model 200 is or has
been trained as described below to generate a vectorized
map with smooth varying polyline representations of fea-
tures (e.g., lane boundaries, road boundaries, and center
lines) in the environment surrounding the vehicle. The
smooth varying polylines are free of zig zags and intersec-
tions with another. For example, in certain aspects, the map
generation model 200 is or has been trained as described
below to generate a vectorized map with a polyline com-
prising a plurality of line segments, wherein a comparison
(e.g., ratio) of changes of slope (e.g., standard deviation of
slopes) between consecutive line segments of the polyline to
slopes (e.g., function of slopes such as an average) of the
plurality of line segments of the polyline satisfies a threshold
(e.g., is less than a threshold).

In certain aspects, the map generation model 200 can be
switched to 1) generate a vectorized map with convex
polygon representations of features (e.g., pedestrian cross-
ings, roundabouts, or traffic islands) in the environment
surrounding the vehicle, 2) generate a vectorized map with
smooth varying polyline representations of features (e.g.,
lane boundaries, road boundaries, and center lines) in the
environment surrounding the vehicle, or 3) generate a vec-
torized map with smooth varying polyline representations of
features (e.g., lane boundaries, road boundaries, and center
lines) and with convex polygon representations of features
(e.g., pedestrian crossings, roundabouts, or traffic islands) in
the same environment. For example, an object detection
model may be configured to determine a type of feature to
be represented in the vectorized map, and switch the map
generation model 200 to suit the type of features as repre-
sented by a polygon or a polyline.

For example, in certain aspects, there may be multiple
different map generation models 200, such as one to generate a vectorized map with convex polygon representations
of features (e.g., pedestrian crossings, roundabouts, or traffic
islands) in the environment surrounding the vehicle and one
to generate a vectorized map with smooth varying polyline
representations of features (e.g., lane boundaries, road
boundaries, and center lines) in the environment surround-
ing the vehicle. In certain aspects, the map generation
system may be configured to switch between the different
map generation models 200. In certain aspects, the map
generation system may be configured to run the different
map generation models 200 in parallel.

In certain aspects, the map generation model 200 can
switch back and forth between generating a vectorized map
with convex polygon representations of features in the
environment surrounding the vehicle and generating a vec-
torized map with smooth varying polyline representations of
features in the environment surrounding the vehicle, such as
switch back and forth between different map generation
models 200. For example, the map generation model 200
may switch back and forth at a given time interval, such as
according to a frame rate of image capture by one or more
sensors, such as approximate every 40 ms, 50 ms, or 60 ms.
For example, the map generation model may be configured
to generate a vectorized map with convex polygon repre-
sentations of features in the environment surrounding the
vehicle followed by generate a vectorized map with smooth
varying polyline representations of features in the environ-
ment surrounding the vehicle.

Switching back and forth between generating the vector-
ized maps may have computational advantages. For
example, if the ADAS is a single processor system (e.g.,
single core), has limited memory, or a limited cache memory
available to a CPU, it may more computationally efficient to
switch back and forth between generating a vectorized map
with convex polygon representations of features and gener-
ating a vectorized map with smooth varying polyline rep-
resentations of features.

In certain aspects, the map generation model 200 can
generate a vectorized map with convex polygon represen-
tations of features in the environment surrounding the
vehicle and generate a vectorized map with smooth varying
polyline representations of features in the environment sur-
rounding the vehicle in parallel. For example, the map
generation model 200 can uses parallel processing (e.g.,
multiple processors) to simultaneously generate a vectorized
map with convex polygon representations of features in the
environment surrounding the vehicle and generate a vector-
ized map with smooth varying polyline representations of
features in the environment surrounding the vehicle, such as
by running different map generation models 200 in parallel.

Generating the vectorized map with polygon representa-
tions of features and the vectorized map with polyline
representations of features in parallel may have the technical
advantage of ensuring that the features represented in the
two different vectorized maps of the same environment are
correlated in space and time. In other words, the spatial
locations of polygon representations of features and polyline
representations of features do not have to be spatially
adjusted based on a time difference between processing the
vectorized maps. As a result, the vectorized maps may be
combined to form a vectorized map composed of polyline
and polygon representations of features in the environment
surrounding the vehicle without having to spatially adjust
the locations polyline representations of features.

In certain aspects, the map generation model 200 may
include a neural network (e.g., convolutional neural network
(CNN)) with parameters that are iteratively adjusted during training. In certain aspects, the map generation model 200 includes an encoder side and a decoder side. The encoder side may be a 2D CNN or a 3D CNN. The decoder side may be a 2D CNN, a 3D CNN, or a transformer model. In certain aspects, at each training iteration, a subset of training sensor data is input to the map generation model 200, which outputs a predicted vectorized map. The polygon loss, $L_{polygon}$, is calculated for the set of polygons in the predicted vectorized map and/or the polyline loss. $L_{polyline}$, is calculated for the set of polylines in the predicted vectorized map. The term "set" as used herein may include one or more elements, such as a set of elements may include one or more elements. The parameters of the map generation model 206 are iteratively adjusted during training based on the loss function in Equation (1), such as until the loss function reaches a local minimum, reaches at least a threshold, a certain number of iterations are performed, etc. For example, the loss function may be reduced (e.g., minimized) using back propagation to compute the gradient of the loss function with respect to the parameters $\alpha_1$, $\alpha_2$, and $\alpha_3$ in Equation (1). In particular, for each training iteration, the parameters of the map generation model 200 may be adjusted such that the polygon loss and/or the polyline loss in Equation (1) that are determined for each predicted vectorized map approaches a minima of the loss function.

Polygon Loss

Traditional methods of training map generation models do not include a loss term that corrects for irregular-shaped polygons. Instead, traditional methods of training map generation models focus on improving the polygons individually, without paying attention to geometrical shapes of polygons in the predicted vectorized maps produced at each iteration. However, in real environments, pedestrian crossing are rectangular or have trapezoidal shapes. The polygon loss, $L_{polygon}$, in Equation (1) is an unsupervised loss that may be used to train the map generation model with labeled sets of training sensor data.

In certain aspects, the polygon loss, $L_{polygon}$, in Equation (1) can be determined using a 0-1 loss function that creates a penalty for each non-convex polygon in a predicted vectorized map given by:

$$L_{polygon} = \sum_{j=1}^{M} 1_{\{P_j \notin C\}} \qquad \text{Equation (2)}$$

where
    M is the number of polygons in the predicted vectorized map;
    C is the set of convex polygons;
    $P_j$ is the i-th polygon of the predicted vectorized map with j=1, . . . , M; and
    the summand is an indicator function given by $$1_{\{P_j \notin C\}} = \begin{cases} 0 & \text{if } P_j \in C \\ 1 & \text{if } P_j \notin C \end{cases}$$

The indicator function is a convexity measure of the polygon $P_j$. Training may stop with respect to the polygon loss when the convexity measure is zero (e.g., no penalty added to the polygon loss in Equation (2)) for each of polygons in the vectorized map. In other words, although the polygon loss has reached a minimum, training may continue for the other loss terms in Equation (1). For example, training may stop with respect to the polygon loss, when the internal angles at points comprising the polygon $P_j$ are all less than or equal to 180 degrees. Otherwise, if at least one of the internal angles of the polygon $P_j$ is greater than 180 degree, then the polygon $P_j$ is not convex (e.g., $P_j \notin C$) and the corresponding convexity measure is one (e.g., a penalty of one is added to the polygon loss in Equation (2)).

In certain aspects, the convexity measure of the polygon $P_j$ is determined by calculating the angle $\theta_i$ at each point $v_i$ of the polygon $P_j$, where i=1, . . . , N. For example, for each point $v_i$ of the polygon $P_j$, the corresponding angle can be determined by:

$$\theta_i = \arccos\left(\frac{u_{i+1} \cdot u_i}{\|u_{i+1}\| \|u_i\|}\right) \qquad \text{Equation (3)}$$

where $u_{i+1} = v_{i+1} - v_i$ and $u_i = v_{i-1} - v_i$.

If $\theta_i > 180°$ for the corresponding point $v_i$ of the polygon $P_j$, the polygon $P_j$ is not convex. The polygon loss in Equation (2) approaches zero as the polygons of the predicted vectorized maps produced after each iteration approach convex polygons. Training may stop when the polygons of each predicted vectorized map converge on convex-shaped polygons. In other words, training may stop with respect to the polygons when the internal angles of the polygons are less than or equal to 180 degrees. In other words, although the polygon loss has reached a minimum, training may continue for the other loss terms in Equation (1).

Figure 3A:
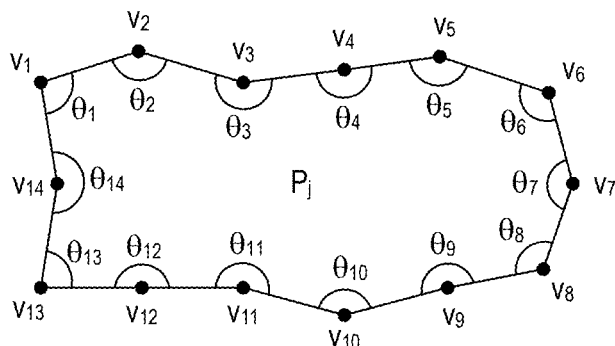
FIGS. 3A-3B depict examples of a non-convex polygon and convex polygons, respectively.
Figure 3B:
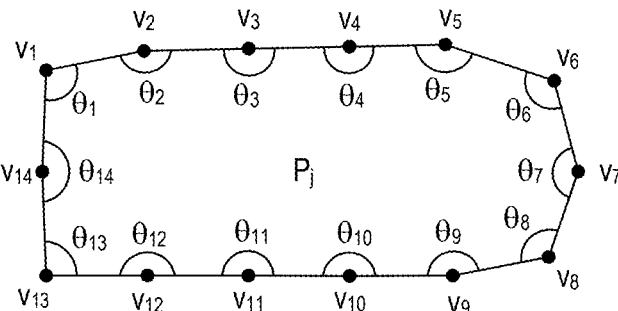

FIG. 3A depicts an example of a non-convex polygon composed of fourteen points. The angles associated with each point of the polygon are indicated. In this example, the angles $\theta_3$, $\theta_9$, $\theta_{11}$, and $\theta_{14}$ are greater than 180 degrees. FIG. 3B depicts an example of a convex polygon composed of fourteen points. None of the angles associated with points of the polygon is greater than 180 degrees.

In certain aspects, the polygon loss, $L_{polygon}$, in Equation (1) can be determined as follows:

$$L_{polygon} = \sum_{j=1}^{M} \left(1 - C\left(P_j, P_j^c\right)\right) \qquad \text{Equation (4)}$$

where $$P_j^c$$

is the convex hull of the polygon $P_j$;

$$C\left(P_j, P_j^c\right) = \text{Area } (P_j)/\text{Area } \left(P_j^c\right);$$

Area($P_j$) is the area of the polygon $P_j$; and $$\text{Area } \left(P_j^c\right)$$

is the area of the convex hull $$P_j^c.$$

The convex hull $$P_j^c$$

is the smallest set of convex points of the polygon $P_j$ that contains the polygon $P_j$. In other words, the convex hull $$P_j^c$$

is a subset of points of the polygon $P_j$ that forms a convex polygon and can envelop the polygon $P_j$. In certain aspects, the convex hull $$P_j^c$$

may be determined using a Graham scan or a Jarvis March method.

FIG. 4 depicts an example non-convex polygon, an example convex hull of the polygon, and an example of calculating a convexity measure as a function of the area of the polygon and the area of the convex hull. In this example, a non-convex polygon 402 is composed of a set of fourteen points 404. The area of the non-convex polygon 402 is represented by a shaded region 406. The convex hull 408 of non-convex polygon 402 is composed of a set of eight points 410. The set of points 410 of the convex hull 408 is a subset of the set of points 404 of the non-convex polygon 402 and envelops the non-convex polygon 402. The area of the convex hull 408 is represented by a shaded-region 412. The convexity measure 414 is a ratio of the area of the polygon 402 to area of the convex hull 408.

The summand in Equation (4) is a total convexity measure of the polygons in a predicted vectorized map. As the area Area($P_j$) approaches the $$\text{Area}\left(P_j^c\right)$$

after each training iteration, the value of $$C\left(P_j, P_j^c\right)$$

approaches the value 1 and the convexity measure $$\left(1 - C\left(P_j, P_j^c\right)\right)$$

of the polygon $P_j$ approaches the value zero. In other words, the polygon loss in Equation (4) approaches zero as the polygons of the predicted vectorized map produced after each iteration approach convex polygons.

In certain aspects, the iterative process of training the map generation model according to the polygon loss in Equation (4) can be stopped when the polygon loss is less than a polygon loss threshold given by:

$$L_{polygon} \leq Th_{polygon} \qquad \text{Equation (5)}$$

where $Th_{polygon}$ denotes the polygon loss threshold, which may be set to a value between 0 and 1. For example, the polygon loss threshold can be set to 0.05, 0.10, 0.15, 0.20, or 0.25.

In certain aspects, the loss contribution weight $\alpha_2$ associated with the polygon loss in Equation (1) may be scaled up or down during training. For example, when more convexity is desired, the loss contribution weight $\alpha_2$ may be increased. By contrast, when less convexity is desired, the loss contribution weight $\alpha_2$ may be decreased.

Polyline Loss

In certain aspects, the polyline loss, $L_{polyline}$, in Equation (1) can be determined for each training iteration as a function of intersecting polyline loss and/or tangent smooth polyline loss as follows:

$$L_{polyline} = w_1 L_g + w_2 L_{tang} \qquad \text{Equation (6)}$$

where
  $w_1$ and $w_2$ are contribution weights;
  $L_g$ is the intersecting polyline loss; and
  $L_{tang}$ is the tangent smoothness polyline loss.
The polyline loss, $L_{polyline}$, in Equation (1) may be used to train the map generation model based on unsupervised learning with labeled sets of training sensor data. There is no need to add extra annotations to the training sensor data.

In certain aspects, the weights $w_1$ and $w_2$ range from 0 to 1. For example, in certain aspects, when the polyline loss is only a function of the intersecting polyline loss, $L_g$, the weight $w_2$ can be set to zero. In certain aspects, when the polyline loss is only a function of the tangent smoothness polyline loss, $L_{tang}$, the weight $w_2$ can be set to zero. In certain aspects, the weights can be $w_1=w_2=\frac{1}{2}$, giving the intersecting polyline loss and the tangent smoothness polyline loss equal weight.

Traditional methods of training map generation models do not include a loss term that corrects for intersecting polylines. Instead, traditional methods of training map generation models focus on improving the polylines individually, without paying attention to geometrical connections between polylines in the predicted vectorized maps produced at each iteration. However, in real environments, center lines do not intersect with road boundaries and center lines and road boundaries are not jagged or zig-zag. The polyline loss in Equation (6) may have the technical advantage of ensuring that trained map generation models do not generate vectorized maps with self-intersecting polyline representations of road boundaries and center lines and do not generate vectorized maps with intersecting pair polylines representations of road boundaries and center lines.

In certain aspects, the intersecting polyline loss $L_g$ in Equation (6) has the technical advantage of iteratively correcting for intersecting polylines in the predicted vectorized maps during training. In certain aspects, the tangent smoothness polyline loss $L_{tang}$ in Equation (5) has the technical advantage of iteratively smoothing polylines in the predicted vectorized maps during training.

In certain aspects, for each training iteration, a sweep line algorithm can be used to identify pairs of intersecting polylines for every combination of pairs of polylines in a predicted vectorized map. An upper-triangular intersection matrix, X, is defined between each pair of polylines in the predicted vectorized map. Let $P_i$ and $P_j$ represent two polylines of the predicted vectorized map, where i, j=1, . . . , M. The upper-triangular intersection matrix is an M×M matrix. For every combination of pairs of polylines in the predicted vectorized map, the elements of the upper-triangular intersection matrix X are given by:

$$X_{ij} = \begin{cases} 0 & \text{if } P_i \text{ does not intersect } P_j \\ 1 & \text{if } P_i \text{ intersects } P_j \end{cases} \qquad \text{Equation (7)}$$

Note that self-intersecting polylines correspond to non-zero elements located on the diagonal of the intersection matrix X. The intersecting polyline loss in Equation (5) is given by:

$$L_g = \|vec\,(X)\|_1 \qquad \text{Equation (8)}$$

where vec(X) represents vectorization of the upper-triangular intersection matrix X; and $\|\cdot\|_1$ is the L1 norm of a vector.

In certain aspects, a horizontal sweep line is incrementally stepped vertically in the y-direction. For each incremental step of the sweep line, a first point $(x_a, y_a)$ that lies on the sweep line and intersects the polyline $P_i$ can be determined and a second point $(x_b, y_b)$ that lies on the sweep line and intersects the second polyline $P_j$ can be determined. At each incremental step of the sweep line in the y-direction, a difference can be calculated between x-coordinates, $d_{ba}=x_b-x_a$. If the sgn($d_{ba}$) does not change during the sweep, the polyline $P_i$ and the polyline $P_j$ do not intersect and the corresponding matrix element $X_{ij}=0$. If the sgn($d_{ba}$) changes sign (e.g., positive to negative) during the sweep, the polyline $P_i$ and the polyline $P_j$ intersect and the corresponding matrix element $X_{ij}=1$. In another aspect, a vertical sweep line is incrementally stepped horizontally in the x-direction and difference is calculated as $d=y_b-y_a$ and checked for a sign change at each step.

Figure 5A:
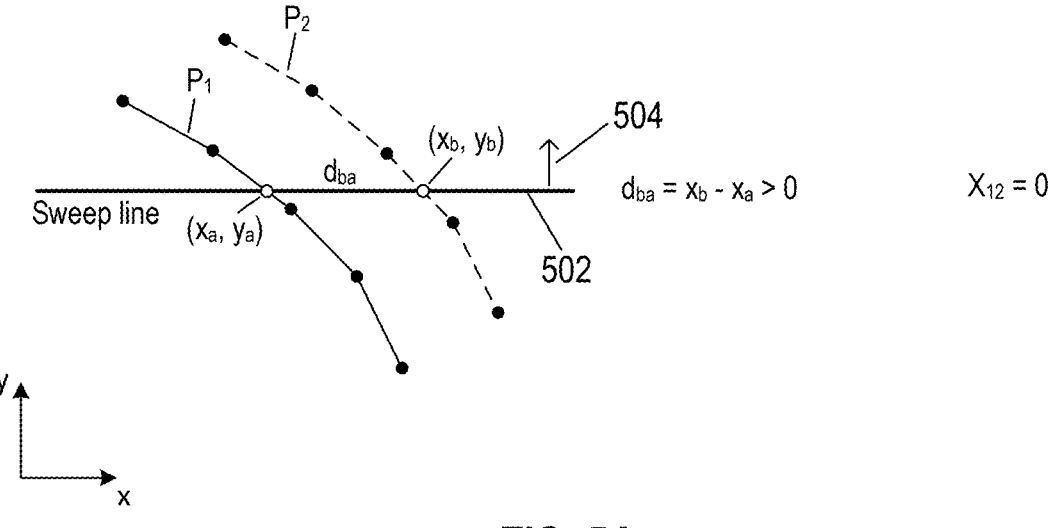
FIGS. 5A-5C depict an example of determining an intersecting polyline loss using a horizontal sweep line to determine pairs of intersecting polylines.
Figure 5B:
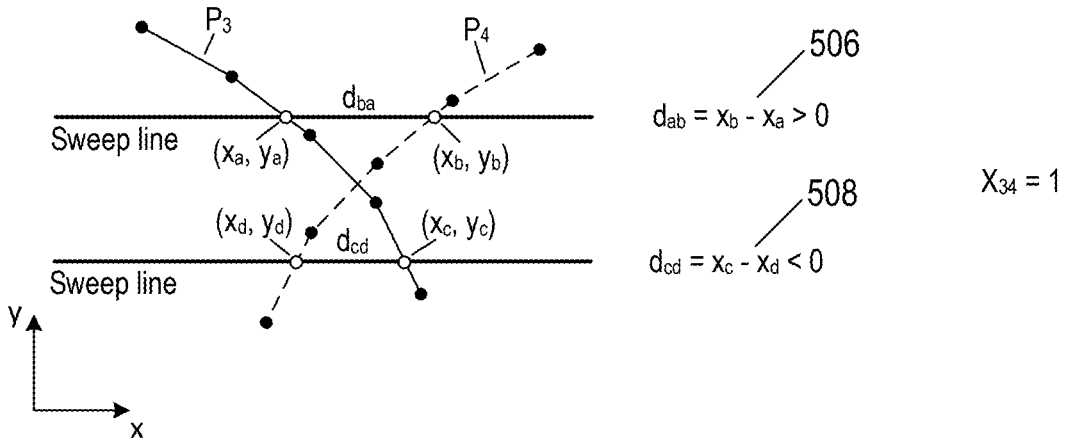
Figure 5C:
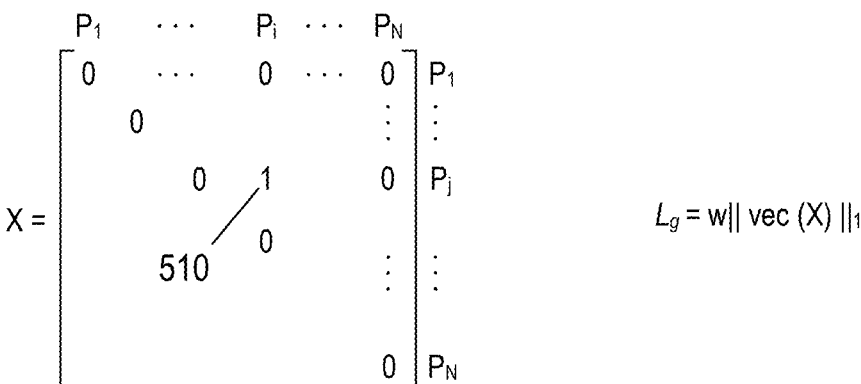

FIGS. 5A-5C depict an example of determining an intersecting polyline loss using a horizontal sweep line to determine pairs of intersecting polylines. FIG. 5A depicts a first polyline $P_1$ and a second polyline $P_2$ that lie in the xy-plane. A sweep line 502 is used to calculate a difference between x-coordinates, $d_{ba}=x_b-x_a$. The sgn ($d_{ba}$) does not change as the sweep line is incrementally stepped in the vertical direction 504. As a result, the corresponding matrix element $X_{12}=0$. FIG. 5B depicts a third polyline $P_3$ and a fourth polyline $P_4$ that lie in the xy-plane. In this example, the sweep line is shown at two locations where the differences 506 and 508 have changed sign, indicating that the third polyline $P_3$ and the fourth polyline $P_4$ intersect. As a result, the corresponding matrix element $X_{34}=1$. FIG. 5C depicts an example upper-triangular intersection matrix X with matrix elements that represent interesting and non-intersecting polylines of a predicted vectorized map. In this example, matrix element $X_{ij}$ 510 equals 1, which corresponds to intersecting polylines $P_i$ and $P_j$.

In certain aspects, for each training iteration, a tangent smoothness polyline loss $L_{tang}$ can be calculated for the polylines of a predicted vectorized map. In traversing each polyline from one point to the next point, a smooth polyline does not have sudden jumps. The tangent smoothness polyline loss creates a penalty for sudden zig-zags or jumps in the polylines of the predicted vectorized map. In certain aspects, tangent smoothness polyline loss is determined by calculating a vector between consecutive points of the each polyline in a predicted vectorized map. Consider a polyline defined by a set of points $$P_j = \{v_i\}_{i=1}^N.$$

For each set of consecutive triple points $(v_i, v_{i+1}, v_{i+2})$ of the polyline (e.g., i=1, . . . , N−2), a cosine similarity is calculated as follows:

$$cs(u_{i+1}, u_i) = \frac{u_{i+1} \cdot u_i}{\|u_{i+1}\|\|u_i\|} \qquad \text{Equation (9)}$$

where $u_i=v_{i+1}-v_i$ and $u_{i+1}=v_{i+2}-v_{i+1}$ are vectors that correspond to a pair of adjacent line segments of a polyline.

As discussed above, each polyline contains a sequence of points separated by line segments (See e.g., FIGS. 1B and 1D). In certain aspects, the cosine similarity in Equation (8) is computed for each triplet of points (e.g., pair of adjacent line segments) of each polyline. The value of the cosine similarity ranges between −1 and 1 and is a measure of the degree of similarity in the directions of the vectors $u_i$ and $u_{i+1}$. If the $cs(u_{i+1}, u_i)=0$, then the vectors $u_i$ and $u_{i+1}$ are at 90° (e.g., the vectors $u_i$ and $u_{i+1}$ are perpendicular to one another). If the $cs(u_{i+1}, u_i)=1$, then the vectors $u_i$ and $u_{i+1}$ are at 0° (e.g., the vectors $u_i$ and $u_{i+1}$ point in the same direction and are located along a straight line). If the $cs(u_{i+1}, u_i)=-1$, then the vectors u; and $u_{i+1}$ are at 180° (e.g., the vectors $u_i$ and $u_{i+1}$ point in opposite directions and are located along a straight line).

In certain aspects, a tangent loss is calculated for each triplet (e.g., each pair of adjacent line segments) of a polyline. The tangent loss for a triplet is a measure of the change in slope of two adjacent vectors u; and $u_{i+1}$ (e.g., corresponding line segments) that share the same point $v_{i+1}$.

In certain aspects, a tangent loss for the triplet can be given by:

$$L_{tang}^i = \frac{1 - cs(u_{i+1}, u_i)}{1 + cs(u_{i+1}, u_i) + \varepsilon} \qquad \text{Equation (10)}$$

where $\varepsilon$ is added for numerical stability (e.g., $\varepsilon=10^{-5}$ or $10^{-5}$).

Figure 6A:
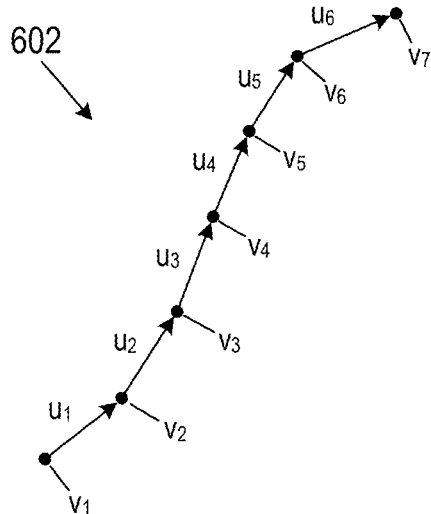
FIGS. 6A-6B depict an example of calculating tangent loss for triple points of a polyline.
Figure 6B:
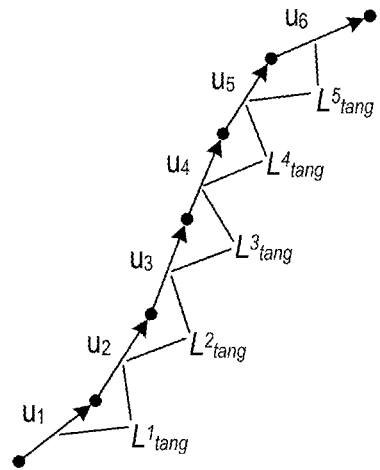

FIGS. 6A-6B depict an example of calculating tangent loss for triple points of a polyline 602. In FIG. 6A, the polyline 602 is composed of an order set of seven points $$\{v_i\}_{i=1}^7.$$

Vectors, $$\{u_i\}_{i=1}^6,$$

are computed between each consecutive pair of points. In FIG. 6B, a tangent loss is calculated for each consecutive triplet (e.g., pair of adjacent vectors or line segments) according to any one Equations (9a)-(9g). For example, a tangent loss $$L_{tang}^1$$

is calculated for the consecutive triplet $(v_1, v_2, v_3)$ based on vectors $u_1$ and $u_2$.

In certain aspects, the polyline tangent loss associated with each polyline of the predicted vectorized map comprises an average change in slopes of line segments of a polyline $P_j$ given by:

$$\overline{L_{tang}}(P_j) = \frac{1}{N-2}\sum_{i=1}^{N-2}L_{tang}^i \qquad \text{Equation (11)}$$

In certain aspects, the standard deviation of the average change in slopes of line segments of the polyline $P_j$ is given by $$\widetilde{L_{tang}}(P_j) = \sqrt{\frac{1}{N-2}\sum_{i=1}^{N-2}\left(L_{tang}^i - \overline{L_{tang}}(P_j)\right)^2} \qquad \text{Equation (12)}$$

In certain aspects, the tangent smoothness polyline loss of the predicted vectorized map in Equation (6) is given by:

$$L_{tang} = \sum_{j=1}^M \frac{\widetilde{L_{tang}}(P_j)}{\overline{L_{tang}}(P_j)} \qquad \text{Equation (13)}$$

In certain aspects, the loss contribution weight $\alpha_3$ associated with the polyline loss in Equation (1) may be scaled up or down during training. For example, when smoother polylines are desired, the loss contribution weight $\alpha_3$ may be increased. In certain aspects, the smoothness of polylines may also be adjusted by scaling the weight $w_2$ in Equation (6) up or down.

In certain aspects, the iterative process of training the map generation model with respect to the polyline loss can be stopped when the polyline loss in Equation (13) is less than a polyline loss threshold given by:

$$L_{polygon} \leq Th_{polyline} \qquad \text{Equation (14)}$$

where $Th_{polyline}$ denotes the polyline loss threshold, which may be set to a value between 0 and 1. For example, the polyline loss threshold can be set to 0.05, 0.10, 0.15, 0.20, or 0.25. When the condition in Equation (14) is satisfied, the polyline representations of lane boundaries, center lines, and road boundaries are smooth (e.g., no zig zags) and do not intersect.

Calculation of the polyline loss is not limited to the tangent loss for the triplet in Equation (10). In certain aspects, the tangent loss for the triplet used in Equation (11) may be calculated as a hinge loss given by:

$$L_{tang}^i = \max(0,1 - cs(u_{i+1}, u_i)) \qquad \text{Equation (15a)}$$

In certain aspects, the tangent loss for the triplet used in Equation (11) may be is given by:

$$L_{tang}^i = (2 - cs(u_{i+1}, u_i))\log(2 - cs(u_{i+1}, u_i)) \qquad \text{Equation (15b)}$$

In certain aspects, the tangent loss for the triplet used in Equation (11) may be is given by:

$$L_{tang}^i = (2 - cs(u_{i+1}, u_i))^2 \log(2 - cs(u_{i+1}, u_i)) \qquad \text{Equation (15c)}$$

In certain aspects, the base of the logarithms in Equations (15b) and (15c) can be any numerical value. For example, the logarithm can be a base 2, base e (e.g., natural logarithm), or base 10. In certain aspects, the tangent loss for the triplet used in Equation (11) may be is given by:

$$L_{tang}^i = (1 - cs(u_{i+1}, u_i))^2 \qquad \text{Equation (15d)}$$

In certain aspects, the tangent loss for the triplet used in Equation (11) may be is given by:

$$L_{tang}^i = \exp\left(\frac{1}{cs(u_{i+1}, u_i) - 1}\right) \qquad \text{Equation (15e)}$$

In certain aspects, the tangent loss for the triplet used in Equation (11) may be calculated based on the L1 norm, or the L2 norm, of the adjacent vectors $u_i$ and $u_{i+1}$ as follows:

$$L_{tang}^i = \left\| \frac{u_{i+1}}{\|u_{i+1}\|} - \frac{u_i}{\|u_i\|} \right\| \qquad \text{Equation (15f)}$$

where $\|\cdot\|$ can be the L1 norm (e.g., Manhattan distance) or the L2 norm (e.g., Euclidean distance).

Aspects Related to Utilizing a Map Generation Model

FIG. 2 depicts an example of input and output of a map generation model 200. In this example, the map generation model 200 receives as input sensor data corresponding to one or more sensors, such as obtained by one or more sensors of a vehicle as discussed. Though certain types of sensor data are described with respect to map generation model 200 for ease of illustration, it should be noted that additional and/or alternative sensor data may be used, or even less sensor data (e.g., only one of images 202 or point cloud data 204).

In certain aspects, the map generation model 200 is configured to generate a vectorized map with convex polygon representations of features (e.g., pedestrian crossings, roundabouts, or traffic islands) in the environment surrounding the vehicle. The convex polygons have internal angles less than or equal to 180 degrees. For example, the map generation model 200 may have been trained using a polygon loss function as discussed herein, such that the output of the map generation model 200 abides by the polygon loss function.

In certain aspects, the map generation model 200 is configured to generate a vectorized map with smooth varying polyline representations of features (e.g., lane boundaries, road boundaries, and center lines) in the environment surrounding the vehicle. The smooth varying polylines are free of zig zags and intersections with another. For example, in certain aspects, the map generation model 200 is configured to generate a vectorized map with a polyline comprising a plurality of line segments, wherein a comparison (e.g., ratio) of changes of slope (e.g., standard deviation of slopes) between consecutive line segments of the polyline to slopes (e.g., function of slopes such as an average) of the plurality of line segments of the polyline satisfies a threshold (e.g., is less than a threshold). For example, in certain aspects, the map generation model 200 is configured to generate a vectorized map with a plurality of polylines such that each polyline comprises a plurality of line segments. For each respective polyline, a comparison (e.g., ratio) of changes of slope (e.g., standard deviation of slopes) between consecutive line segments of the respective polyline to slopes (e.g., function of slopes such as an average) of the plurality of line segments is calculated. The sum of comparisons (e.g., ratios) for all of the polylines in the vectorized map satisfies a threshold (e.g., is less than a threshold). For example, the map generation model 200 may have been trained using a polyline loss function as discussed herein, such that the output of the map generation model 200 abides by the polyline loss function. Accordingly the comparison may correspond to one of the polyline loss functions, or be based on one of the polyline loss functions. For example, the changes of slope between consecutive line segments may be determined as or based on a standard deviation as discussed. Further, the function of the slopes may be an average or other function, such as cosine similarity, tangent loss, etc. In certain aspects, the change in slope may be measured by a tangent loss for a triplet of points along the polyline (e.g., each pair of adjacent line segments) that is a function of cosine similarity between two adjacent vectors formed by the triplet of points. In certain aspects, the change in slope may be measured by a tangent loss for a triplet of points (e.g., each pair of adjacent line segments) that is a function of the L1 norm of two adjacent vectors formed by the triplet of points. In certain aspects, the change in slope may be measured by a tangent loss for a triplet of points (e.g., each pair of adjacent line segments) that is a function of the L2 norm of two adjacent vectors formed by the triplet of points.

In certain aspects, the map generation model 200 can be switched to 1) generate a vectorized map with convex polygon representations of features (e.g., pedestrian crossings, roundabouts, or traffic islands) in the environment surrounding the vehicle, 2) generate a vectorized map with smooth varying polyline representations of features (e.g., lane boundaries, road boundaries, and center lines) in the environment surrounding the vehicle, or 3) generate a vectorized map with smooth varying polyline representations of features (e.g., lane boundaries, road boundaries, and center lines) and with convex polygon representations of features (e.g., pedestrian crossings, roundabouts, or traffic islands) in the same environment. For example, an object detection model may be configured to determine a type of feature to be represented in the vectorized map, and switch the map generation model 200 to suit the type of features as represented by a polygon or a polyline.

In certain aspects, there may be multiple different map generation models 200, such as one to generate a vectorized map with convex polygon representations of features (e.g., pedestrian crossings, roundabouts, or traffic islands) in the environment surrounding the vehicle and one to generate a vectorized map with smooth varying polyline representations of features (e.g., lane boundaries, road boundaries, and center lines) in the environment surrounding the vehicle, and map generation system may be configured to switch between the different map generation models 200.

Example Operations for Training a Map Generation Model

Figure 7:
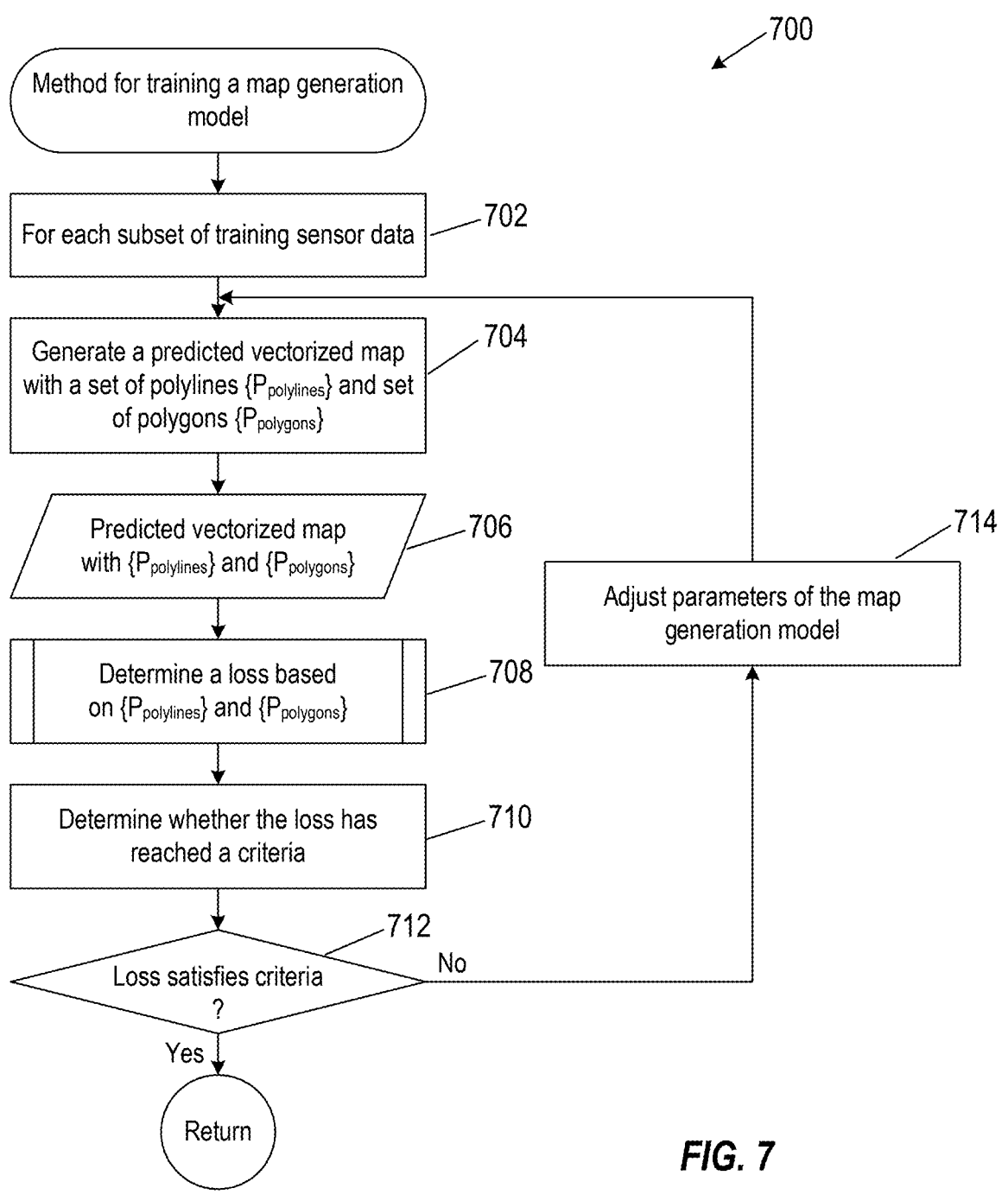
FIG. 7 depicts a flow diagram of a method for training a map generation model.
Figure 9:
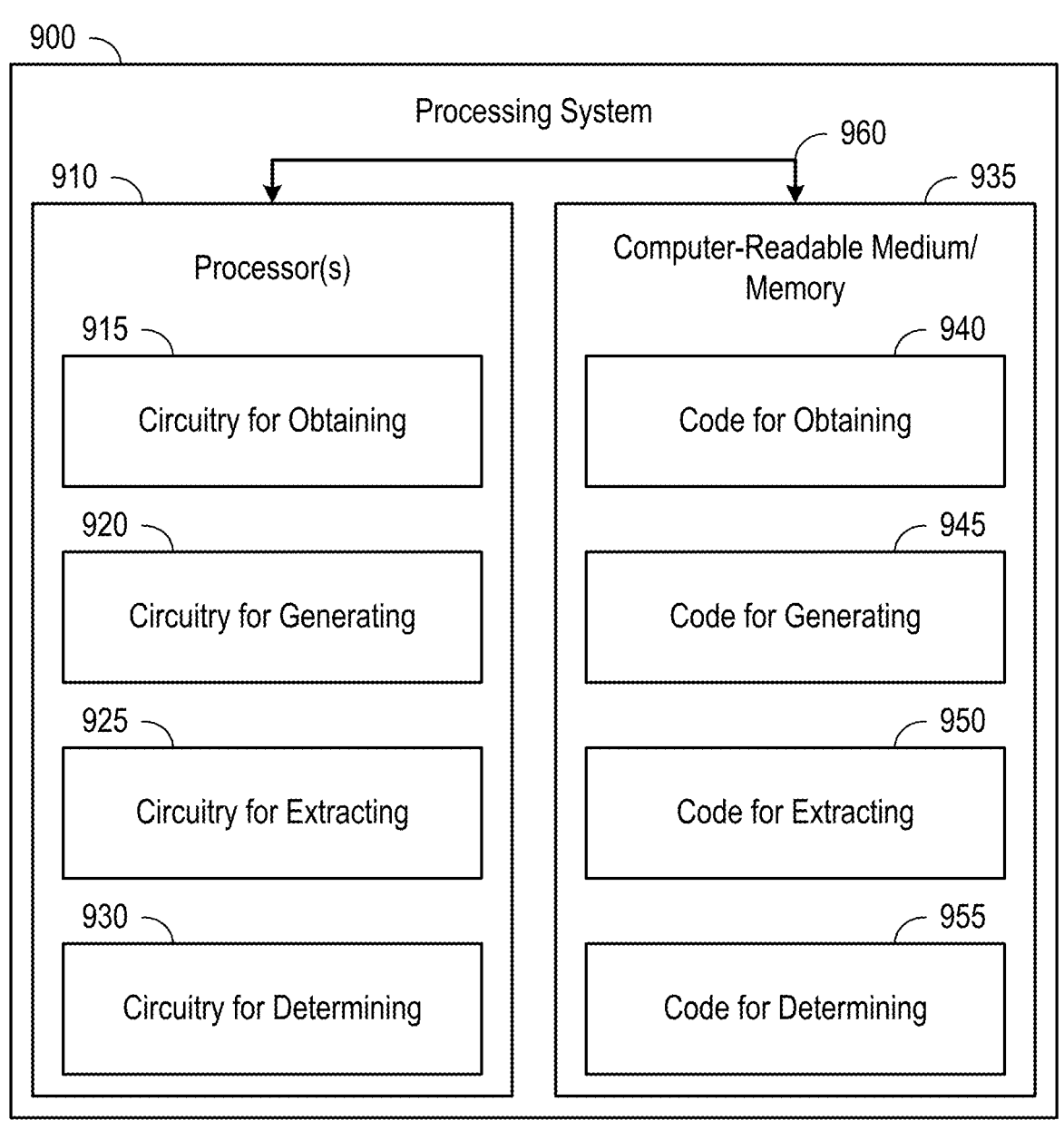
FIG. 9 depicts aspects of an example processing system.

In certain aspects, a method 700 depicted in FIG. 7, or any aspect related to it, may be performed by an apparatus, such as processing system 900 of FIG. 9, which includes various components operable, configured, or adapted to perform the method 700.

Note that FIG. 7 is just one example of a method, and other methods including fewer, additional, or alternative steps are possible consistent with this disclosure.

Method 700 begins with a loop beginning at block 702, which repeats the operations represented by blocks 704, 708, and 710 for each subset of training sensor data obtained by one or more sensors, as discussed.

The method 700 then proceeds to block 704 with generating a predicted vectorized map composed of a set of polygons and/or a set of polylines as described above with reference to FIG. 2. The set of polygons represents features, such as pedestrian crossings, in the environment. The set of polylines represents features, such as center lines and road boundaries, in the environment.

The method 700 then proceeds to block 708 with determining a loss according to Equation (1) is based on the set of polygons and/or the set of polylines in the predicted vectorized map output from block 704. In certain aspects, an example process for determining a loss based on the set of polygons and/or the set of polylines is described below with reference to FIG. 8.

The method 700 then proceeds to block 710 with determining whether the loss obtained in block 708 has reached a criteria (e.g., minimum value, threshold value, number of iterations, etc.).

The method 700 then proceeds to block 712, and if the loss has reached the criteria, the training process of the map generation model is complete.

Otherwise, the method 700 then proceeds to block 714 with adjusting parameters of the map generation model based on the loss obtained in block 708 using back propagation.

The method 700 then proceeds to repeat the operations represented by blocks 704, 708, and 710 for another subset of training sensor data.

Figure 8:
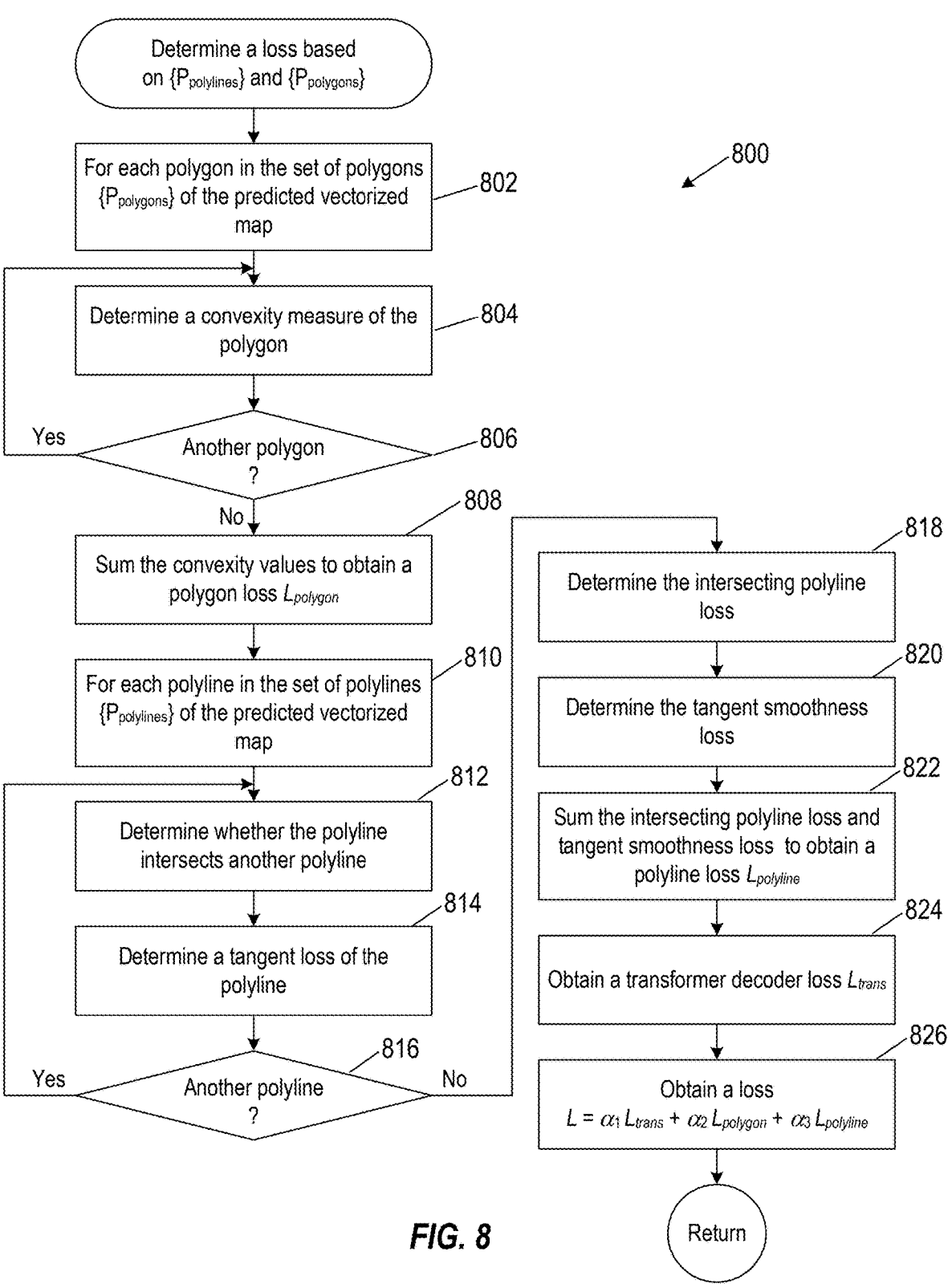
FIG. 8 depicts a flow diagram of a method for determining a loss based on polylines and polygons in a predicted vectorized map.

In certain aspects, a method 800 of FIG. 8, or any aspect related to it, may be performed by an apparatus, such as processing system 900 of FIG. 9, which includes various components operable, configured, or adapted to perform the method 800.

Note that FIG. 8 is just one example of a method, and other methods including fewer, additional, or alternative steps are possible consistent with this disclosure.

Method 800 begins with a loop in block 802 that repeats the operation represented by block 804 for each polygon in the set of polygons of the predicted vectorized map.

The method 800 then proceeds to block 804 with determining a convexity measure of the polygon. In certain aspects, the convexity measure can be determined as described above with reference to Equation (2). In certain aspects, the convexity measure can be determined as described above with reference to Equation (4).

The method 800 then proceeds to block 806 with repeating the operation of block 804 for another polygon in the set of polygons.

Otherwise, the method 800 proceeds to block 808 with summing the convexity measures obtained in block 804 for each polygon. In certain aspects, the convexity measures are summed as described above with reference to Equation (2). In certain aspects, the convexity measure are summed as described above with reference to Equation (4).

The method 800 then proceeds with a loop in block 810 that repeats the operations represented by blocks 812 and 814 for each polygon in the set of polygons of the predicted vectorized map.

The method 800 then proceeds to block 812 with determining whether the polyline intersects (e.g., self-intersect or intersect other polylines) another polyline in set of polylines as described above with reference to Equation (6).

The method 800 then proceeds to block 814 with determining a tangent loss as described above with reference to Equations (8)-(10).

The method 800 then proceeds to block 816 with repeating the operations represented by blocks 812 and 814 for another polyline in the set of polylines.

Otherwise, the method 800 then proceeds to block 818 with determining the intersecting polyline loss as described above with reference to Equation (7).

The method 800 then proceeds to block 820 with determining the tangent smoothness loss as described above with reference to Equation (11).

The method 800 then proceeds to block 822 with summing the intersecting polyline loss obtained in block 818 with the tangent smoothness loss obtained in block 820 to obtain the polyline loss as described above with reference to Equation (5).

The method 800 then proceeds to block 824 with obtaining the transformer loss.

The method 800 then proceeds to block 826 with determining the loss by summing the polygon loss obtained in block 808, the polyline loss obtained in block 822, and the transformer loss obtained in block 824.

The methods 700 and 800 may provide numerous technical advantages over existing methods of training map generation models. For example, the polygon loss and/or the polyline loss may be added to the loss function of any transformer model for vectorized map generation and may significantly reduce the unwanted technical problems associated with intersecting and jagged polylines and non-convex polygons described above.

In another example, post processing of vectorized maps so that polyline and/or polygon predictions in predicted vectorized maps are usable for downstream tasks, such as autonomous driving, may be unnecessary.

In another example, the polygon loss and/or the polyline loss can be used to check properties of predicted polylines and/or polygons of predicted vectorized maps during training without a comparison to ground truth maps. In other words, the polygon loss and the polyline loss may provide unsupervised training of the map generation model and may not require any extra annotations.

In another example, computation of the polygon loss and/or the polyline loss has complexity of $\mathcal{O}(\text{NlogN})$, where N is the number of points per polyline or polygon, which is very small and is done per batch of subsets of training sensor data. Extra calculations during the inference may be unnecessary because the parameters of the map generation model may be adjusted by the polygon loss and/or polyline loss during training to output more accurate vectorized maps.

In another example, because the polygon loss and/or the polyline loss induce geometrical constraints on the polylines and polygons while being used in unsupervised training, the polygon loss and/or the polyline loss may reduce the amount of training data for a given level of accuracy in the predictions.

Example Processing System for Representing Polylines and Polygons

FIG. 9 depicts an example processing system 900 configured to perform various aspects described herein, including, for example, method 700 and method 800 as described above with respect to FIGS. 7-8.

Processing system 900 includes one or more processors 910. In various aspects, the one or more processors 910 may be representative of one or more of a receive processor, a transmit processor, and/or a controller/processor. The one or more processors 910 are coupled to a computer-readable medium/memory 935 via a bus 960. In certain aspects, the computer-readable medium/memory 935 is configured to store instructions (e.g., computer-executable code) that when executed by the one or more processors 910, enable and cause the one or more processors 910 to perform the method 700 and method 800 as described above with respect to FIGS. 7-8, or any aspect related to it, including any operations described in relation to FIGS. 7-8. Note that reference to a processor performing a function of processing system 900 may include one or more processors performing that function of processing system 900, such as in a distributed fashion.

In the depicted example, computer-readable medium/memory 935 stores code for obtaining 940, code for generating 945, code for extracting 950, and code for determining 955. Processing of the code 940-955 may enable and cause the processing system 900 to perform the method 700 described with respect to FIG. 7 and the method 800 described with respect to FIG. 8, or any aspect related to it.

The one or more processors 910 include circuitry configured to implement (e.g., execute) the code stored in the computer-readable medium/memory 935, including circuitry for obtaining 915, circuitry for generating 920, circuitry for extracting 925, and circuitry for determining 930. Processing with circuitry 915-930 may enable and cause the processing system 900 to perform the method 700 described with respect to FIG. 7 and the method 800 described with respect to FIG. 8, or any aspect related to it.

More generally, means for obtaining, generating, extracting, or determining may include one or more processors 910 of the processing system 900 in FIG. 9.

Example Operations for Generating a Map

Figure 11:
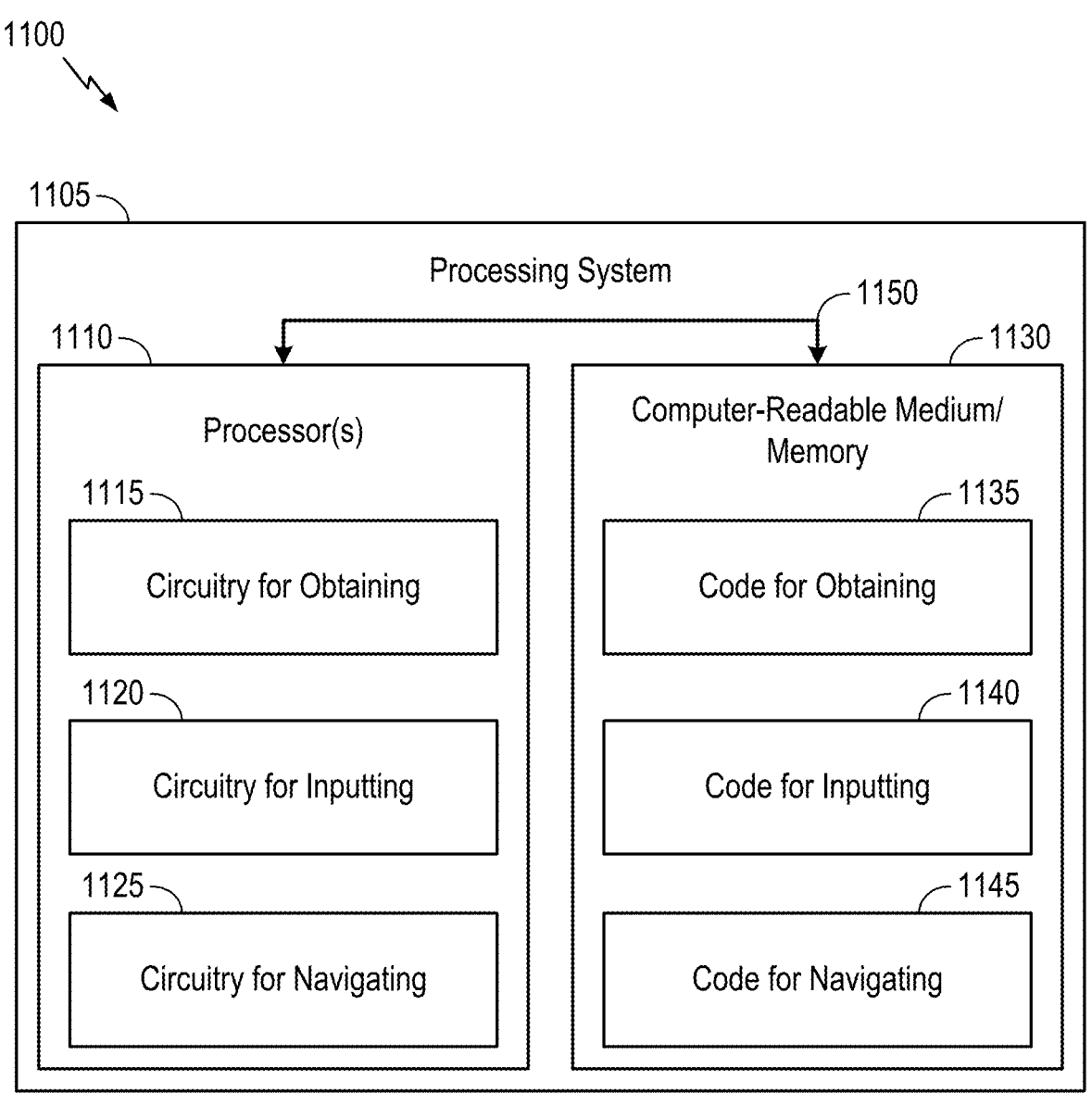
FIG. 11 depicts aspects of an example processing system.

In certain aspects, a method 1000 depicted in FIG. 10, or an aspect related to it, may be performed by an apparatus, such as processing system 1100 of FIG. 11, which includes various components operable, configured, or adapted to perform the method 1000.

Note that FIG. 10 is just one example of a method, and other methods including fewer, additional, or alternative steps are possible consistent with this disclosure.

Method 1000 begins at block 1005 with obtaining the sensor data from one or more sensors. The sensor data corresponds to an environment comprising one or more features including a first feature having one or more changes in curvature.

Method 1000 then proceeds to block 1010 with inputting the sensor data to a map generation model.

Method 1000 then proceeds to block 1015 with obtaining as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a (e.g., polyline loss) threshold.

In certain aspects, the one or more features comprise a second feature having one or more changes in curvature; and the vectorized map represents the second feature as a convex polygon, wherein all internal angles of the convex polygon are less than or equal to 180 degrees.

In certain aspects, the environment comprises a second feature having one or more changes in curvature and the method includes: inputting the sensor data to a second map generation model; and obtaining as output from the second map generation model a second vectorized map, wherein the second vectorized map represents the second feature as a convex polygon, wherein all internal angles of the convex polygon are less than or equal to 180 degrees.

In certain aspects, the method includes: combining the vectorized map and the second vectorized map into a combined vectorized map.

In certain aspects, the method includes obtaining as output from the map generation model the vectorized map and obtain as output from the second map generation model the second vectorized map in parallel.

In certain aspects, the method includes obtaining as output from the map generation model the vectorized map and obtain as output from the second map generation model the second vectorized map serially.

In certain aspects, the method includes selecting between the map generation model configured to represent features as polylines and a second map generation model configured to represent features as polygons based on the one or more features.

In certain aspects, the method includes periodically switching between the map generation model configured to represent features as polylines and a second map generation model configured to represent features as polygons based on the one or more features.

In certain aspects, the comparison of the changes of slope between consecutive line segments of the polyline to the slopes of the plurality of line segments of the polyline comprises at least one of:

a comparison of a standard deviation of the slopes of the plurality of line segments to an average slope of the slopes of the plurality of line segments;

a comparison of the changes of slope between consecutive line segments of the polyline to a function of the slopes of the plurality of line segments; or a comparison of the changes of slope between consecutive line segments of the polyline to an average of the slopes of the plurality of line segments.

In certain aspects, the comparison of the changes of slope between consecutive line segments of the polyline to the slopes of the plurality of line segments of the polyline comprises a ratio of the changes of slope between consecutive line segments of the polyline to the slopes of the plurality of line segments of the polyline.

In certain aspects, the one or more sensors comprise one or more image sensors configured to capture the sensor data, and wherein the sensor data comprises one or more perspective view images of the environment.

In certain aspects, the one or more sensors comprise one or lidar sensors configured to capture the sensor data, wherein the sensor data comprises one or more point clouds of the environment.

In certain aspects, the first feature comprises one or more of:

a road boundary;

a center line;

a lane line; or an edge line.

In certain aspects, the method includes navigating a vehicle through the environment based on the vectorized map.

In certain aspects, an apparatus performing the method includes one or more of a vehicle, a robot, or a drone.

In certain aspects, the vectorized map represents the one or more features as one or more polylines.

In certain aspects, the map generation model has been trained based on training data and a loss as a function of a polyline loss of polyline representations of features, wherein the loss prevents self-intersection of polylines and prevents pairs of polylines from intersecting.

In certain aspects, the map generation model has been trained to promote reduction of changes of slope of polylines.

In certain aspects, the map generation model has been trained based on:

for each of one or more combinations of pairs of polylines of a plurality of polylines in the vectorized map, a determination of whether the respective pair of polylines intersect;

obtainment of an upper-triangular intersection matrix with zero-value matrix elements corresponding to pairs of polylines that do not intersect and one-value matrix elements corresponding to pairs of polylines that intersect; and a determination of a polyline loss as an L1 norm of the upper-triangular intersection matrix.

In certain aspects, the map generation model has been trained based on:

for each of one or more polylines in the vectorized map:

for each of one or more consecutive triplet of points along the respective polyline, a determination of a respective tangent loss for the respective consecutive triplet of points;

a determination of a respective polyline tangent loss of the respective polyline as an average change in slopes of line segments of the respective polyline;

a determination of a standard deviation of the average change in slopes; and a determination of a tangent smoothness polyline loss based on the respective polyline tangent losses and the standard deviations of the polylines; and a determination whether the tangent smoothness polyline loss is less than the threshold.

Note that FIG. 10 is just one example of a method, and other methods including fewer, additional, or alternative operations are possible consistent with this disclosure.

Example Processing System for Generating a Map

Processing system 1100 includes one or more processors 1110. In various aspects, the one or more processors 1110 are coupled to a computer-readable medium/memory 1130 via a bus 1160. In certain aspects, the computer-readable medium/memory 1130 is configured to store instructions (e.g., computer-executable code), including code 1135-1145, that when executed by the one or more processors 1110, enable and cause the one or more processors 1110 to perform the method 1000 described with respect to FIG. 10, or any aspect related to it, including any operations described in relation to FIG. 10. Note that reference to a processor performing a function of processing system 1100 may include one or more processors performing that function of processing system 1100, such as in a distributed fashion.

In the depicted example, computer-readable medium/memory 1130 stores code for obtaining 1135, code for inputting 1140, and code for navigating 1145. Processing of the code 1135-1145 may enable and perform the method 1000 described with respect to FIG. 10, or any aspect related to it.

The one or more processors 1110 include circuitry configured to implement (e.g., execute) the code (e.g., executable instructions) stored in the computer-readable medium/memory 1130, including circuitry for obtaining 1115, circuitry for inputting 1120, and circuitry for navigating 1125. Processing with circuitry 1115-1125 may enable and cause the processing system 1100 to perform the method 1000 described with respect to FIG. 10, or any aspect related to it.

More generally, means for obtaining, inputting, or navigating may include one or more processors 1110 of the processing system 1100 in FIG. 11.

Example Operations for Generating a Map

Figure 13:
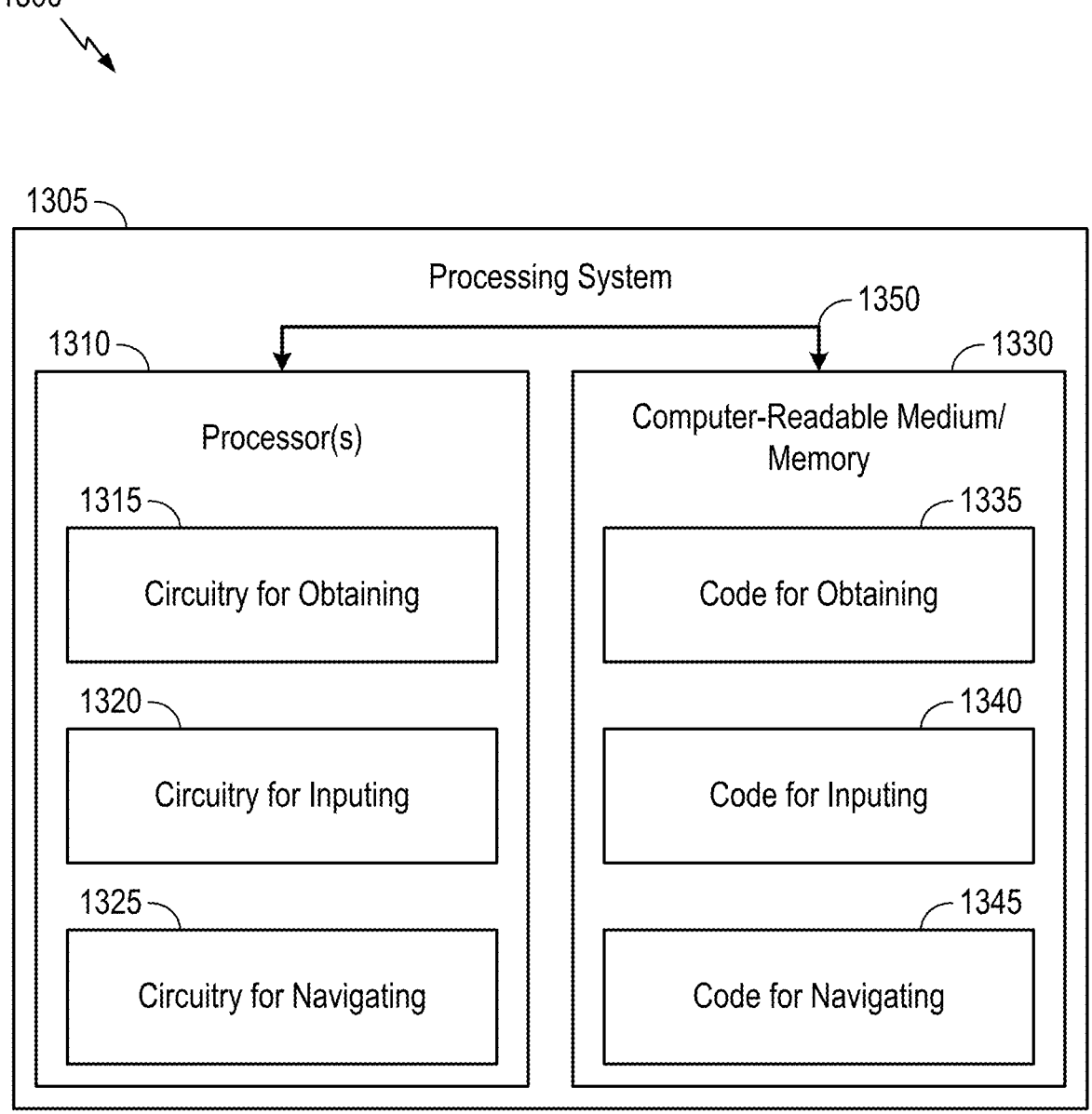
FIG. 13 depicts aspects of an example processing system.

In certain aspects, a method 1200 depicted in FIG. 12, or an aspect related to it, may be performed by an apparatus, such as processing system 1300 of FIG. 13, which includes various components operable, configured, or adapted to perform the method 1200.

Method 1200 begins at block 1205 with obtaining the sensor data from one or more sensors. The sensor data corresponds to an environment comprising one or more features including a first feature having one or more changes in curvature.

Method 1200 then proceeds to block 1210 with inputting the sensor data to a map generation model.

Method 1200 then proceeds to block 1215 with obtaining as output from the map generation model a vectorized map of the one or more features of the environment, wherein the vectorized map represents the first feature as a convex polygon, wherein all internal angles of the convex polygon are less than or equal to 180 degrees.

In certain aspects, the one or more sensors comprise one or more image sensors; and the sensor data comprises perspective view images of the environment.

In certain aspects, the one or more sensors comprise one or more lidar sensors; and the sensor data comprises one or more point clouds of the environment.

In certain aspects, the first feature comprises one or more of: a pedestrian crossing; a roundabout; or a traffic island.

In certain aspects, method 1200 further includes navigating a vehicle through the environment based on the vectorized map.

In certain aspects, the apparatus comprises the one or more sensors, and the apparatus comprises one or more of a vehicle or a drone.

In certain aspects, the vectorized map represents the one or more features as one or more polygons.

In certain aspects, the map generation model has been trained based on training data and a loss as a polygon loss of polygon representations of features.

In certain aspects, the polygon loss of polygon representations of features comprises a loss function that assigns a penalty for each non-convex polygon.

In certain aspects, the map generation model has been trained based on a determination that each of one or more polygons in the vectorized map is a convex polygon.

In certain aspects, the map generation model has been trained to promote convexity of polygons.

In certain aspects, the the map generation model has been trained based on:

for each polygon of one of more polygons of the vectorized map:
  a determination of a respective area of the polygon;
  a determination of a respective convex hull of the polygon; and
  a determination of a respective convexity measure as a function of a ratio of the respective area of the polygon to the respective convex hull of the polygon; and
a determination of a polygon loss as a sum of respective convexity measures.

In certain aspects, the map generation model has been trained based on a determination of the polygon loss being less than a polygon loss threshold.

In certain aspects, the map generation model has been trained to at least one of:

generate the vectorized map with polygon representations of features in the environment;
generate the vectorized map with polyline representations of features in the environment; or
generate the vectorized map with polygon representations of features in the environment and polyline representations of features in the environment.

In certain aspects, the map generation model has been trained to be switched to generate the vectorized map with polygon representations of features in the environment or to generate the vectorized map with polyline representations of features in the environment.

Note that FIG. 12 is just one example of a method, and other methods including fewer, additional, or alternative operations are possible consistent with this disclosure.

Example Processing System for Generating a Map

Processing system 1300 includes one or more processors 1310. In various aspects, the one or more processors 1310 are coupled to a computer-readable medium/memory 1330 via a bus 1350. In certain aspects, the computer-readable medium/memory 1330 is configured to store instructions (e.g., computer-executable code), including code 1135-1145, that when executed by the one or more processors 3110, enable and cause the one or more processors 1310 to perform the method 1200 described with respect to FIG. 12, or any aspect related to it, including any operations described in relation to FIG. 12. Note that reference to a processor performing a function of processing system 1300 may include one or more processors performing that function of processing system 1300, such as in a distributed fashion.

In the depicted example, computer-readable medium/ memory 1330 stores code for obtaining 1335, code for inputting 1340, and code for navigating 1345. Processing of the code 1335-1345 may enable and perform the method 1200 described with respect to FIG. 12, or any aspect related to it.

The one or more processors 1310 include circuitry configured to implement (e.g., execute) the code (e.g., executable instructions) stored in the computer-readable medium/ memory 1330, including circuitry for obtaining 1315, circuitry for inputting 1320, and circuitry for navigating 1325. Processing with circuitry 1315-1325 may enable and perform the method 1200 described with respect to FIG. 12, or any aspect related to it.

More generally, means for obtaining, inputting, or navigating may include one or more processors 1310 of the processing system 1300 in FIG. 13.

Example Clauses

Implementation examples are described in the following numbered clauses:

Clause 1: A method for training a map generation model, comprising: obtaining sensor data corresponding to one or more sensors; and training the map generation model to generate a vectorized map of features of the environment based on the sensor data and a loss as a function of one or more of: 1) a polygon loss of polygon representations of the features, or 2) a polyline loss of polyline representations of the features.

Clause 2: The method of Clause 1, wherein: the one or more sensors comprise one or more image sensors; and the sensor data comprises perspective view images of the environment.

Clause 3: The method of any one of Clauses 1-2, wherein: the one or more sensors comprise one or more lidar sensors; and the sensor data comprises one or more point clouds of the environment.

Clause 4: The method of any one of Clauses 1-3, wherein training the map generation model comprises: for each subset of a plurality of subsets of the sensor data: inputting the subset of the sensor data to the map generation model; obtaining, as respective output from the map generation model, a respective vectorized map of features of the environment; determining a respective loss based on a respective polygon loss of polygon representations of the features of the environment in the respective vectorized map or a respective polyline loss of polyline representations of the features of the environment in the respective vectorized map; and adjusting parameters of the map generation model based on the respective loss.

Clause 5: The method of any one of Clauses 1-4, wherein training the map generation model comprises: determining a convexity value for each polygon of one or more polygons in the vectorized map; and obtaining the polygon loss as a sum of each convexity value of the one or more polygons.

Clause 6: The method of any one of Clauses 1-5, wherein determining the convexity value for each polygon of the one or more polygons in the vectorized map comprises: for each polygon of one or more polygons in the vectorized map: determining whether the polygon is convex; and obtaining a respective convexity value of the polygon based on whether the polygon is convex.

Clause 7: The method of any one of Clauses 1-6, wherein determining the convexity value for each polygon of the one or more polygons in the vectorized map comprises: for each polygon of one or more polygons in the vectorized map: determining a respective area of the polygon; determining a respective convex hull of the polygon; and determining a respective convexity value of the polygon based on the area and convex hull of the polygon.

Clause 8: The method of any one of Clauses 1-7, wherein training the map generation model comprises: for every combination of pairs of polylines of a plurality of polylines in the vectorized map: obtaining an upper-triangular intersection matrix with zero-value matrix elements corresponding to pairs of polylines that do not intersect and one-value matrix elements corresponding to pairs of polylines that intersect; and determining the polyline loss as an L1 norm of the upper-triangular intersection matrix.

Clause 9: The method of any one of Clauses 1-8, wherein training the map generation model comprises: for each polyline in the vectorized map: for each consecutive triplet of points along the respective polyline: determining a respective cosine similarity of the respective consecutive triplet of points; and determining a respective tangent loss of the respective consecutive triplet of points based on the cosine similarity; and obtaining a polyline tangent loss of the respective polyline as a sum of tangent losses; and obtaining the polyline loss as a sum of polyline tangent losses of the respective polylines of the vectorized map.

Clause 10: The method of any one of Clauses 1-9, wherein the loss is a function of at least the polygon loss multiplied by a first parameter and the polyline loss multiplied by a second parameter.

Clause 11: The method of any one of Clauses 1-10, wherein the environment is traveled by a vehicle comprising the one or more sensors.

Clause 12: One or more apparatuses, comprising: one or more memories comprising executable instructions; and one or more processors configured to execute the executable instructions and cause the one or more apparatuses to perform a method in accordance with any one of clauses 1-12.

Clause 13: One or more apparatuses, comprising: one or more memories; and one or more processors, coupled to the one or more memories, configured to cause the one or more apparatuses to perform a method in accordance with any one of Clauses 1-12

Clause 14: One or more apparatuses, comprising: one or more memories; and one or more processors, coupled to the one or more memories, configured to perform a method in accordance with any one of Clauses 1-12.

Clause 15: One or more apparatuses, comprising means for performing a method in accordance with any one of Clauses 1-12.

Clause 16: One or more non-transitory computer-readable media comprising executable instructions that, when executed by one or more processors of one or more apparatuses, cause the one or more apparatuses to perform a method in accordance with any one of Clauses 1-12.

Clause 17: One or more computer program products embodied on one or more computer-readable storage media comprising code for performing a method in accordance with any one of Clauses 1-12.

Clause 18: A method for wireless communications by an apparatus comprising: obtaining sensor data from one or more sensors, the sensor data corresponding to an environment comprising one or more features including a first feature having one or more changes in curvature; inputting the sensor data to a map generation model; and obtaining as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a threshold.

Clause 19: The method of Clause 18, wherein: the one or more features comprise a second feature having one or more changes in curvature; and the vectorized map represents the second feature as a convex polygon, wherein all internal angles of the convex polygon are less than or equal to 180 degrees.

Clause 20: The method of any one of Clauses 18-19, wherein the environment comprises a second feature having one or more changes in curvature; and further comprising: inputting the sensor data to a second map generation model; and obtaining as output from the second map generation model a second vectorized map, wherein the second vectorized map represents the second feature as a convex polygon, wherein all internal angles of the convex polygon are less than or equal to 180 degrees.

Clause 21: The method of any one of Clauses 18-20, further comprising combining the vectorized map and the second vectorized map into a combined vectorized map.

Clause 22: The method of any one of Clauses 18-21, further comprising obtaining as output from the map generation model the vectorized map and obtaining as output from the second map generation model the second vectorized map in parallel.

Clause 23: The method of any one of Clauses 18-22, further comprising obtaining as output from the map generation model the vectorized map and obtain as output from the second map generation model the second vectorized map serially.

Clause 24: The method of any one of Clauses 18-23, further comprising selecting between the map generation model configured to represent features as polylines and a second map generation model configured to represent features as polygons based on the one or more features.

Clause 25: The method of any one of Clauses 18-24, further comprising periodically switching between the map generation model configured to represent features as polylines and a second map generation model configured to represent features as polygons based on the one or more features.

Clause 26: The method of any one of Clauses 18-25, wherein the comparison of the changes of slope between consecutive line segments of the polyline to the slopes of the plurality of line segments of the polyline comprises at least one of: a comparison of a standard deviation of the slopes of the plurality of line segments to an average slope of the slopes of the plurality of line segments; a comparison of the changes of slope between consecutive line segments of the polyline to a function of the slopes of the plurality of line segments; or a comparison of the changes of slope between consecutive line segments of the polyline to an average of the slopes of the plurality of line segments.

Clause 27: The method of any one of Clauses 18-26, wherein the comparison of the changes of slope between consecutive line segments of the polyline to the slopes of the plurality of line segments of the polyline comprises a ratio of the changes of slope between consecutive line segments of the polyline to the slopes of the plurality of line segments of the polyline.

Clause 28: The method of any one of Clauses 18-27, wherein the one or more sensors comprise one or more image sensors configured to capture the sensor data, and wherein the sensor data comprises one or more perspective view images of the environment.

Clause 29: The method of any one of Clauses 18-28, wherein the one or more sensors comprise one or lidar sensors configured to capture the sensor data, wherein the sensor data comprises one or more point clouds of the environment.

Clause 30: The method of any one of Clauses 18-29, wherein the first feature comprises one or more of: a road boundary; a center line; a lane line; or an edge line.

Clause 31: The method of any one of Clauses 18-30, wherein the vectorized map represents the one or more features as one or more polylines.

Clause 32: The method of any one of Clauses 18-31, wherein the map generation model has been trained based on training data and a loss as a function of a polyline loss of polyline representations of features, wherein the loss prevents self-intersection of polylines and prevents pairs of polylines from intersecting.

Clause 33: The method of any one of Clauses 18-32, wherein the map generation model has been trained to promote reduction of changes of slope of polylines.

Clause 34: The method of any one of Clauses 18-33, wherein the map generation model has been trained based on: for each of one or more combinations of pairs of polylines of a plurality of polylines in the vectorized map, a determination of whether the respective pair of polylines intersect; obtainment of an upper-triangular intersection matrix with zero-value matrix elements corresponding to pairs of polylines that do not intersect and one-value matrix elements corresponding to pairs of polylines that intersect; and a determination of a polyline loss as an L1 norm of the upper-triangular intersection matrix.

Clause 35: The method of any one of Clauses 18-34, wherein the map generation model has been trained based on: for each of one or more polylines in the vectorized map: for each of one or more consecutive triplet of points along the respective polyline, a determination of a respective tangent loss for the respective consecutive triplet of points; a determination of a respective polyline tangent loss of the respective polyline as an average change in slopes of line segments of the respective polyline; a determination of a standard deviation of the average change in slopes; and a determination of a tangent smoothness polyline loss based on the respective polyline tangent losses and the standard deviations of the polylines; and a determination whether the tangent smoothness polyline loss is less than the threshold.

Clause 36: The method of any one of Clauses 18-35, further comprising navigateing a vehicle through the environment based on the vectorized map.

Clause 37: One or more apparatuses, comprising: one or more memories comprising executable instructions; and one or more processors configured to execute the executable instructions and cause the one or more apparatuses to perform a method in accordance with any one of clauses 18-36.

Clause 38: One or more apparatuses, comprising: one or more memories; and one or more processors, coupled to the one or more memories, configured to cause the one or more apparatuses to perform a method in accordance with any one of Clauses 18-36.

Clause 39: One or more apparatuses, comprising: one or more memories; and one or more processors, coupled to the one or more memories, configured to perform a method in accordance with any one of Clauses 18-36.

Clause 40: One or more apparatuses, comprising means for performing a method in accordance with any one of Clauses 18-36.

Clause 41: One or more non-transitory computer-readable media comprising executable instructions that, when executed by one or more processors of one or more apparatuses, cause the one or more apparatuses to perform a method in accordance with any one of Clauses 18-36.

Clause 42: One or more computer program products embodied on one or more computer-readable storage media comprising code for performing a method in accordance with any one of Clauses 18-36.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured to generate a map, comprising:
one or more memories configured to store sensor data corresponding to an environment comprising one or more features including a first feature having one or more changes in curvature; and
one or more processors coupled to the one or more memories, the one or more processors configured to:
obtain the sensor data corresponding to one or more sensors;
input the sensor data to a map generation model; and
obtain as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a threshold.

2. The apparatus of claim 1, wherein:
the one or more features comprise a second feature having one or more changes in curvature; and
the vectorized map represents the second feature as a convex polygon, wherein all internal angles of the convex polygon are less than or equal to 180 degrees.

3. The apparatus of claim 1, wherein the environment comprises a second feature having one or more changes in curvature; and the one or more processors are configured to:
input the sensor data to a second map generation model; and
obtain as output from the second map generation model a second vectorized map, wherein the second vectorized map represents the second feature as a convex polygon, wherein all internal angles of the convex polygon are less than or equal to 180 degrees.

4. The apparatus of claim 3, wherein the one or more processors are configured to:
combine the vectorized map and the second vectorized map into a combined vectorized map.

5. The apparatus of claim 3, wherein the one or more processors are configured to:
obtain as output from the map generation model the vectorized map and obtain as output from the second map generation model the second vectorized map in parallel.

6. The apparatus of claim 3, wherein the one or more processors are configured to:
obtain as output from the map generation model the vectorized map and obtain as output from the second map generation model the second vectorized map serially.

7. The apparatus of claim 1, wherein the one or more processors are configured to:
select between the map generation model configured to represent features as polylines and a second map generation model configured to represent features as polygons based on the one or more features.

8. The apparatus of claim 1, wherein the one or more processors are configured to:
periodically switch between the map generation model configured to represent features as polylines and a second map generation model configured to represent features as polygons based on the one or more features.

9. The apparatus of claim 1, wherein the comparison of the changes of slope between consecutive line segments of the polyline to the slopes of the plurality of line segments of the polyline comprises at least one of:
a comparison of a standard deviation of the slopes of the plurality of line segments to an average slope of the slopes of the plurality of line segments;
a comparison of the changes of slope between consecutive line segments of the polyline to a function of the slopes of the plurality of line segments; or
a comparison of the changes of slope between consecutive line segments of the polyline to an average of the slopes of the plurality of line segments.

10. The apparatus of claim 1, wherein the comparison of the changes of slope between consecutive line segments of the polyline to the slopes of the plurality of line segments of the polyline comprises a ratio of the changes of slope between consecutive line segments of the polyline to the slopes of the plurality of line segments of the polyline.

11. The apparatus of claim 1, further comprising the one or more sensors, wherein the one or more sensors comprise one or more image sensors configured to capture the sensor data, and wherein the sensor data comprises one or more perspective view images of the environment.

12. The apparatus of claim 1, further comprising the one or more sensors, wherein the one or more sensors comprise one or lidar sensors configured to capture the sensor data, wherein the sensor data comprises one or more point clouds of the environment.

13. The apparatus of claim 1, wherein the first feature comprises one or more of:
a road boundary;
a center line;
a lane line; or
an edge line.

14. The apparatus of claim 1, wherein the one or more processors are configured to cause the apparatus to:
navigate a vehicle through the environment based on the vectorized map.

15. The apparatus of claim 1, wherein the vectorized map represents the one or more features as one or more polylines.

16. The apparatus of claim 1, wherein the map generation model has been trained based on training data and a loss as a function of a polyline loss of polyline representations of features, wherein the loss prevents self-intersection of polylines and prevents pairs of polylines from intersecting.

17. The apparatus of claim 1, wherein the map generation model has been trained to promote reduction of changes of slope of polylines.

18. The apparatus of claim 1, wherein the map generation model has been trained based on:
for each of one or more combinations of pairs of polylines of a plurality of polylines in the vectorized map, a determination of whether the respective pair of polylines intersect;

obtainment of an upper-triangular intersection matrix with zero-value matrix elements corresponding to pairs of polylines that do not intersect and one-value matrix elements corresponding to pairs of polylines that intersect; and a determination of a polyline loss as an L1 norm of the upper-triangular intersection matrix.

19. The apparatus of claim 1, wherein the map generation model has been trained based on:

for each of one or more polylines in the vectorized map:

for each of one or more consecutive triplet of points along the respective polyline, a determination of a respective tangent loss for the respective consecutive triplet of points;

a determination of a respective polyline tangent loss of the respective polyline as an average change in slopes of line segments of the respective polyline;

a determination of a standard deviation of the average change in slopes; and a determination of a tangent smoothness polyline loss based on the respective polyline tangent losses and the standard deviations of the polylines; and a determination whether the tangent smoothness polyline loss is less than the threshold.

20. A method for generating a map, comprising:

obtaining sensor data from one or more sensors, the sensor data corresponding to an environment comprising one or more features including a first feature having one or more changes in curvature;

inputting the sensor data to a map generation model; and obtaining as output from the map generation model a vectorized map of the one or more features of the environment, wherein the vectorized map represents the first feature as a polyline comprising a plurality of line segments, wherein a comparison of changes of slope between consecutive line segments of the polyline to slopes of the plurality of line segments of the polyline satisfies a threshold.

* * * * *